United States Patent
Jeong et al.

(10) Patent No.: US 11,436,959 B2
(45) Date of Patent: Sep. 6, 2022

(54) DISPLAY APPARATUS HAVING ROLLABLE DISPLAY AND CONTROL METHOD THEREOF

(71) Applicant: SAMSUNG ELECTRONICS CO., LTD., Suwon-si (KR)

(72) Inventors: Seongwook Jeong, Suwon-si (KR); Jisoo Kim, Suwon-si (KR); Sanghee Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/088,844

(22) Filed: Nov. 4, 2020

(65) Prior Publication Data
US 2021/0201722 A1    Jul. 1, 2021

Related U.S. Application Data

(60) Provisional application No. 62/955,705, filed on Dec. 31, 2019.

(30) Foreign Application Priority Data

Jan. 2, 2020   (KR) ........................ 10-2020-0000293

(51) Int. Cl.
*G09G 3/00* (2006.01)
*G09F 9/30* (2006.01)
(Continued)

(52) U.S. Cl.
CPC ............. *G09G 3/035* (2020.08); *G06F 3/011* (2013.01); *G09F 9/301* (2013.01); *G09F 9/37* (2013.01);
(Continued)

(58) Field of Classification Search
CPC .......... G06G 5/34–346; G06G 2380/02; G06F 1/1652; G06F 2203/04102; G06F 3/04886; G06F 1/1616–162; G06F 1/1641
See application file for complete search history.

(56) References Cited

U.S. PATENT DOCUMENTS 9,860,474 B2   1/2018  Park et al.
10,013,955 B2  7/2018  Oh et al.
(Continued)

FOREIGN PATENT DOCUMENTS

JP   WO2004/084171 A1   9/2004
JP   2014-041642 A      3/2014
(Continued)

OTHER PUBLICATIONS

International Search Report (PCT/ISA/210) and Written Opinion (PCT/ISA/237) dated Mar. 15, 2021 issued by the International Searching Authority in International Application No. PCT/KR2020/016641.

*Primary Examiner* — Sanghyuk Park
(74) *Attorney, Agent, or Firm* — Sughrue Mion, PLLC

(57) ABSTRACT

Disclosed is a display apparatus. The display apparatus includes a sensor, a housing including a storage space inside the housing, a display configured to be stored in the storage space inside the housing and to be moved into and out of the housing through an opening of the housing, the display having a display area for displaying contents, an actuator configured to move the display into and out of the housing through the opening, and a processor configured to identify a size of a portion of the display to be disposed outside the housing and a display size of image content to be displayed on the portion of the display, based on a viewing distance of a user sensed through the sensor and a ratio of the image content, and control the actuator to move the display into or
(Continued)

out of the housing through the opening based on the size of the portion of the display and the display size of the image content.

19 Claims, 20 Drawing Sheets

(51) Int. Cl.
    *G09F 9/37*         (2006.01)
    *G06F 3/01*         (2006.01)

(52) U.S. Cl.
    CPC . *G09G 2340/0442* (2013.01); *G09G 2354/00* (2013.01); *G09G 2380/02* (2013.01)

(56) References Cited

U.S. PATENT DOCUMENTS

| | | |
|---|---|---|
| 10,216,398 B2 | 2/2019 | Woo et al. |
| 10,422,996 B2 | 9/2019 | Jin |
| 10,467,949 B2 | 11/2019 | Han et al. |
| 2005/0176470 A1 | 8/2005 | Yamakawa |
| 2010/0060548 A1* | 3/2010 | Choi .................. G06F 3/04886 345/1.3 |
| 2015/0220119 A1* | 8/2015 | Seo ........................ G09F 9/301 345/173 |
| 2016/0307545 A1* | 10/2016 | Lee ....................... G09G 3/2003 |
| 2016/0366454 A1 | 12/2016 | Tatourian et al. |
| 2016/0370877 A1* | 12/2016 | Seo ..................... H04M 1/0268 |
| 2017/0127535 A1 | 5/2017 | Shin et al. |
| 2018/0196266 A1 | 7/2018 | Jin |
| 2018/0375054 A1 | 12/2018 | Wang et al. |
| 2019/0146557 A1* | 5/2019 | Choi ....................... G09F 9/301 361/749 |
| 2019/0155492 A1 | 5/2019 | Woo et al. |
| 2019/0261519 A1 | 8/2019 | Park et al. |
| 2019/0355328 A1 | 11/2019 | Suk et al. |
| 2020/0226971 A1* | 7/2020 | Yi ............................. G09G 5/38 |

FOREIGN PATENT DOCUMENTS

| | | |
|---|---|---|
| JP | 2017129630 A | 7/2017 |
| KR | 10-2005-0010197 A | 1/2005 |
| KR | 10-2014-0144029 A | 12/2014 |
| KR | 10-2016-0123620 A | 10/2016 |
| KR | 10-2017-0043347 A | 4/2017 |
| KR | 10-2017-0043911 A | 4/2017 |
| KR | 10-2019-0101184 A | 8/2019 |
| KR | 10-2036366 B1 | 10/2019 |

* cited by examiner

DISPLAY APPARATUS HAVING ROLLABLE DISPLAY AND CONTROL METHOD THEREOF

CROSS-REFERENCE TO RELATED APPLICATION(S)

This application is based on and claims priority under 35 U.S.C. § 119 to Korean Patent Application No. 10-2020-0000293, filed on Jan. 2, 2020, in the Korean Intellectual Property Office, and U.S. Provisional Application No. 62/955,705, filed on Dec. 31, 2019, in the United States Patent and Trademark Office, the disclosures of which are incorporated by reference herein in their entireties.

BACKGROUND

1. Field

The disclosure relates to a display apparatus and a controlling method thereof and, more particularly, to a rollable display apparatus and a controlling method thereof.

2. Description of Related Art

Various types of electronic devices have been developed and become popular because of the development of electronic technology. In particular, a display apparatus, such as a television (TV), one of the most widely used home appliances in a general household, has been developed for many years.

Recently, a rollable TV, which is housed in a housing in a rolled state in a non-viewing mode, and is exposed to the outside of the housing to display an image in a viewing mode, has been proposed. However, functions provided by the rollable TV have not yet been developed in various ways.

SUMMARY

Embodiments of the disclosure may address the above problems, and may provide a display apparatus providing an optimal viewing content by sensing a user and a controlling method thereof.

According to an embodiment, a display apparatus includes a sensor, a housing comprising a storage space inside the housing, a display configured to be stored in the storage space inside the housing and to be moved into and out of the housing through an opening of the housing, the display having a display area for displaying contents, an actuator configured to move the display into and out of the housing through the opening, and a processor configured to identify a size of a portion of the display area to be disposed outside the housing and a display size of image content to be displayed on the portion of the display, based on a viewing distance of a user sensed through the sensor and a ratio of the image content, and control the actuator to move the display into or out of the housing through the opening based on the size of the portion of the display area and the display size of the image content.

The processor may be further configured to identify a viewing angle of the image content based on a type of the image content and the viewing distance of the user, and identify the size of the portion of the display area and the display size of the image content based on the viewing angle of the image content and the ratio of the image content.

The processor may be further configured to, based on the viewing distance of the user being less than a threshold distance, identify the size of the portion of the display area and the display size of the image content based on the viewing distance of the user and the ratio of the image content.

The display apparatus may further include a communication interface, and the processor may be further configured to, based on receiving, through the communication interface, image content displayed on an external user terminal in a mirroring mode, identify the size of the portion of the display area and the display size of the image content based on the viewing distance of the user, a screen size of the user terminal, and ratio information of the image content.

The processor may be further configured to, based on receiving information on a portion of the image content selected by a user in the image content displayed in the external user terminal, identify the size of the portion of the display area and the display size of the image content based on the viewing distance of the user and the information on the portion of the image content, and the information on the portion of the image content may include ratio information on the portion of the image content.

The processor may be further configured to, while a first portion of the display area is being disposed outside the housing and a second portion of the display area is being disposed inside the housing, control the display to display the image content on the first portion of the display, and based on an event to display a graphic user interface (GUI) occurring, control the actuator so that at least a portion of the second portion is disposed outside the housing based on at least one of size information or ratio information of the GUI.

The processor may be further configured to, while a first portion of the display area is being disposed outside the housing and a second portion of the display area is being disposed inside the housing, control the display to display the image content on the first portion of the display, and based on subtitle content being included in the image content, control the actuator so that at least a portion of the second portion is disposed outside the housing based on a size of the subtitle content.

The processor may be further configured to control the actuator to adjust the size of the portion disposed outside the housing in accordance with a user command, and change at least one of a size of the image content, a resolution of the image content or a type of the image content based on the size of the portion of the display area disposed outside the housing.

A front surface of the housing may be implemented with a transparent material, and the processor may be further configured to, based on the user being sensed through the sensor in a state of the display area being housed in the housing and turned off, control the display to display a background content on a portion of the display area disposed toward a front surface of the housing inside the housing.

A front surface of the housing may be implemented with a transparent material, and the processor may be further configured to, based on the user being sensed for a threshold time or more through the sensor in a state of the display area being housed in the housing and turned off, control the display to display a content displayed before the display was turned off on a portion of the display area disposed toward a front surface of the housing inside the housing.

The display apparatus may further include a memory configured to store a viewing history of a user, and the processor may be further configured to, based on the display being turned on from a state of being turned off, control the display so that the display operates in one of a plurality of display modes based on the viewing history of the user.

According to an embodiment, the disclosure provides a controlling method of a display apparatus comprising a housing comprising a storage space inside the housing, a display configured to be stored in the storage space inside the housing and to be moved into and out of the housing through an opening of the housing, the display having a display area for displaying contents and, an actuator configured to move the display into and out of the housing through the opening, the controlling method may include identifying a size of a portion of the display area to be disposed outside the housing and a display size of image content to be displayed on the portion of the display, based on a viewing distance of a user and a ratio of the image content, and controlling the actuator to move the display into or out of the housing through the opening based on the size of the portion of the display area and the display size of the image content, and displaying the image content on the display.

The identifying of the display size of the image content may include identifying a viewing angle of the image content based on a type of the image content and the viewing distance of the user, and identifying the size of the portion of the display area and the display size of the image content based on the viewing angle of the image content and the ratio of the image content.

The identifying of the display size of the image content may include, based on the viewing distance of the user being less than a threshold distance, identifying the size of the portion of the display area and the display size of the image content based on the viewing distance of the user and the ratio of the image content.

The identifying of the display size of the image content may include, based on receiving, through the communication interface, image content displayed on an external user terminal in a mirroring mode, identifying the size of the portion of the display area and the display size of the image content based on the viewing distance of the user, a screen size of the user terminal, and ratio information of the image content.

The identifying of the display size of the image content may include, based on receiving information on a portion of the image content selected by a user in the image content displayed in the external user terminal, identifying the size of the portion of the display area and the display size of the image content based on the viewing distance of the user and information on the portion of the image content, and the information on the portion of the image content may include ratio information on the portion of the image content.

The method may further include, while a first portion of the display is being disposed outside the housing and a second portion of the display area is being disposed inside the housing, displaying the image content on the first portion of the display, and based on an event to display a graphic user interface (GUI) occurring, moving the display so that at least a portion of the second portion is disposed outside the housing based on at least one of size information or ratio information of the GUI.

The method may further include, while a first portion of the display area is being disposed outside the housing and a second portion of the display area is being disposed inside the housing, displaying the image content on the first portion of the display, and based on subtitle content being included in the image content, moving the display so that at least a portion of the second portion is disposed outside the housing based on a size of the subtitle content.

The method may further include adjusting the size of the portion disposed outside the housing in accordance with a user command, and changing at least one of a size of the image content, a resolution of the image content or a type of the image content based on the size of the portion of the display area disposed outside the housing.

A front surface of the housing may be implemented with a transparent material, and the method may further include, based on the user being sensed in a state of the display area being housed in the housing and turned off, displaying a background content on a portion of the display area disposed toward a front surface of the housing inside the housing.

According to various embodiments above, an optimal viewing content may be provided by sensing a user and convenience for a user may be enhanced.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The disclosure will be described in greater detail below with reference to the accompanying drawings.

After terms used in the present specification are briefly described, the disclosure will be described in detail.

The terms used in the present disclosure and the claims are general terms identified in consideration of the functions of the various embodiments of the disclosure. However, these terms may vary depending on intention, technical interpretation, emergence of new technologies, and the like of those skilled in the related art. Unless there is a specific definition of a term, the term may be understood based on the overall contents and technological understanding of those skilled in the related art.

In this document, the expressions "have," "may have," "including," or "may include" may be used to denote the presence of a feature (e.g., a numerical value, a function, an operation, or a component such as a portion), and does not exclude the presence of additional features.

Expressions such as "at least one of A and/or B" should be understood to represent "A," "B" or any one of "A and B."

The terms such as "first," "second," and so on may be used to describe a variety of elements, but the elements may not be limited by these terms regardless of order and/or importance. The terms are labels used only for the purpose of distinguishing one element from another.

It is to be understood that an element (e.g., a first element) is "operatively or communicatively coupled with/to" another element (e.g., a second element) is that any such element may be directly connected to the other element or may be connected via another element (e.g., a third element). On the other hand, when an element (e.g., a first element) is "directly connected" or "directly accessed" to another element (e.g., a second element), it can be understood that there is no other element (e.g., a third element) between the other elements.

A singular expression includes a plural expression, unless otherwise specified. It is to be understood that the terms such as "comprise" or "consist of" are used herein to designate a presence of a characteristic, number, step, operation, element, component, or a combination thereof, and do not preclude a presence or a possibility of adding one or more of other characteristics, numbers, steps, operations, elements, components or a combination thereof.

The term such as "module," "unit," "portion," and so on may be used to refer to an element that performs at least one function or operation, and such element may be implemented as hardware or software, or a combination of hardware and software. Further, except for when each of a plurality of "modules," "units," "portions," and the like needs to be realized in an individual hardware, the components may be integrated in at least one module or chip and may be realized in at least one processor (not shown).

The disclosure will be described in greater detail with reference to the drawings.

Figure 1:
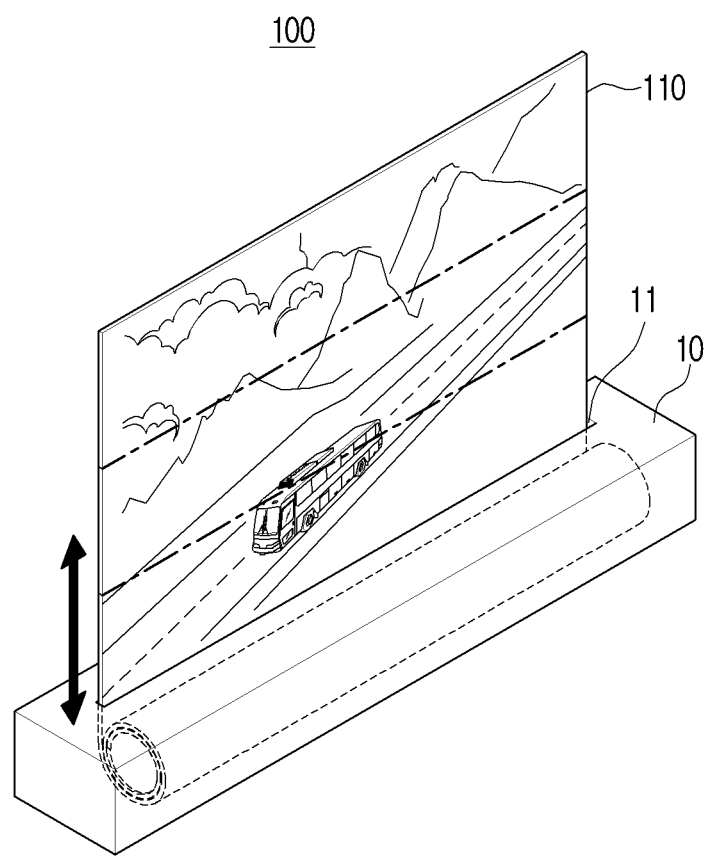
FIG. 1 is a diagram illustrating a structure of a display apparatus according to an embodiment.

FIG. 1 is a diagram illustrating a structure of a display apparatus according to an embodiment.

A display apparatus 100 may be in a type including an imaging device capable of displaying an image and a sound device capable of outputting or recording sound. For example, the display apparatus 100 may be used as an imaging device such as a television (TV), a monitor, or the like, and may be used as an audio device capable of reproducing, outputting, and recording various types of sound sources. In this example, a display 110 configuring the display apparatus 100 may be implemented as a rollable display capable of rolling.

A housing 10 is provided with a space therein to house the display 110 in a rolled state, and an opening 11 is provided at an upper end of the housing 10. In some examples, at least one pair of support stands for supporting the housing 10 with respect to a bottom surface may additionally be provided. The support stand may be installed so that the bottom of the housing 10 is spaced apart from the bottom surface. Here, the bottom surface may be a location where the housing 10 is installed, for example, a bottom of a room, a living room, a bedroom, an office, a public place, or the like.

At least one speaker (not illustrated) outputting the sound of the content reproduced by the display apparatus 100 to the outside may be installed in the housing 10. For example, two speakers may be installed in the housing 10 separately from the display apparatus 100. According to an example, at least one hole may be provided in the housing 10 to transmit the sound output from the two speakers to the outside. In this case, the volume of a sound box of a speaker can be expanded through the housing 10 and there may be an effect of improving sound quality. Alternatively, the front surface of the speaker may be exposed to the outside by forming an opening corresponding to the speaker installed on the front surface of the housing 10. Alternatively, at least one speaker may be installed outside the housing 10. If at least two speakers are installed separately from the display apparatus 100, a larger speaker can be used as compared to embedding the speaker in the display apparatus 100, and a good sound can be provided when the speaker is used as an acoustic device. However, the display apparatus 100 may also include a speaker (not illustrated) therein.

As illustrated, the display 110 may be exposed to the outside of the housing 10 with various heights according to various events. Various embodiments will be described in detail with reference to drawings.

Figure 2:
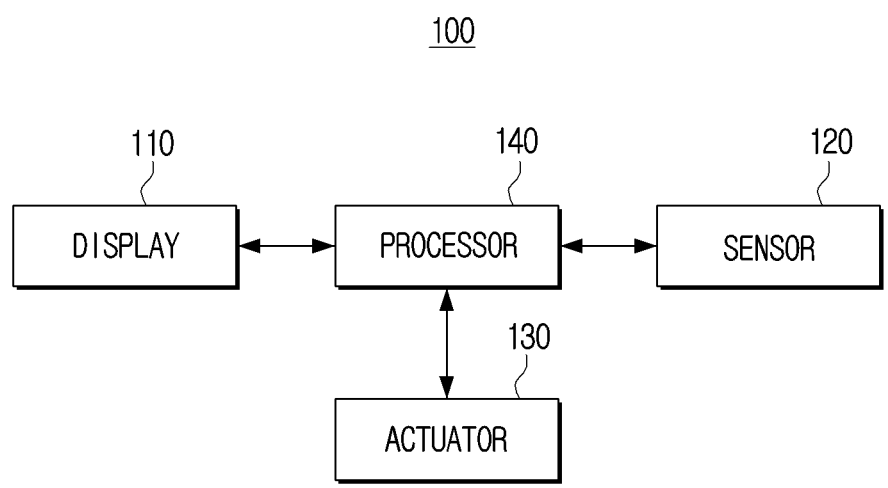
FIG. 2 is a block diagram illustrating a configuration of a display apparatus according to an embodiment.

FIG. 2 is a block diagram illustrating a configuration of a display apparatus according to an embodiment. The display apparatus 100 may include the display 110, a sensor 120, an actuator 130, and a processor 140.

The display apparatus 100 may be implemented with a rollable TV as shown in FIG. 1. However, the embodiment is applicable to a large format display (LFD), a digital signage (digital signboard), a digital information display (DID), a video wall, a projector display, a kiosk, or the like, having a display capable of rolling.

According to an embodiment, the display apparatus 100 may receive an image of various resolutions, various compressed images, or the like. For example, the display apparatus 100 may receive at least one image of a standard definition (SD) of 720×480, high definition (HD) of 1280×720, full high definition (FHD) of 1920×1080, quad high definition (QHD) of 2560×1440, 4K ultra high definition (UHD) of 3840×2160, 8K UHD of 7680×4320, but also an image of a higher resolution (e.g., 16K, 32K). The display apparatus 100 may receive an image in a compressed form such as Moving Picture Experts Group (MPEG) (for example, MP2, MP4, MP7, or the like), joint photographic coding experts group (JPEG), Advanced Image Coding (AVC), H.264, H.265, High Efficiency Image Codec (HEVC), VC-1, VP8, VP9, AOMedian image 1 (AV1), or the like.

The display 110 may be implemented as a display including a self-emitting element or a display including a non-self-limiting element and a backlight. For example, the display 110 may be implemented as a display of various types such as, for example, and without limitation, a liquid crystal display (LCD), organic light emitting diodes (OLED) display, light emitting diodes (LED), micro LED, mini LED, plasma display panel (PDP), quantum dot (QD) display, quantum dot light-emitting diodes (QLED), or the like. In the display 110, a backlight unit, a driving circuit which may be implemented as an a-si TFT, low temperature poly silicon (LTPS) TFT, organic TFT (OTFT), or the like, may be included as well. The display 110 may be implemented as a touch screen coupled to a touch sensor, a flexible display, a rollable display, a third-dimensional (3D) display, a display in which a plurality of display modules are physically connected, a transparent display, a mirror display, or the like.

The sensor 120 may be implemented as a sensor capable of sensing at least one of the presence or absence of the user, the proximity of the user, or a motion of the user. According to an example, the sensor 120 may be implemented as a camera, a proximity sensor, a motion sensor, a touch sensor, or the like. The proximity sensor is a sensor capable of sensing the presence of a surrounding object without physical contact. For example, the proximity sensor may be implemented as at least one of a high frequency oscillating proximity sensor, a fiber optic proximity sensor, an electromagnetic proximity sensor, a capacitive proximity sensor, an optical proximity sensor, or an ultrasonic proximity sensor. According to an example, at least a portion of the sensor 120 may be provided within the housing 10, may be provided on one side of the housing 10, or may be provided in a speaker provided at the front surface of the housing 10. Alternatively, at least a portion of the sensor 120 may be disposed on one side of a bezel portion of the display apparatus 100, for example, in an upper center bezel portion, a left-end center bezel portion, or a right-end center bezel portion. Alternatively, at least a portion of the sensor 120 may be disposed inside the display 110.

The actuator 130 may be installed in the housing 10 (FIG. 1) and can be implemented to move the display 110 into or out of the housing 10 through the opening. In this example, the actuator 130 may be implemented to roll the display 110 with reference to a particular axis within the housing 10. According to an example, a lower end of the display 110 may include an axis, or may be implemented to function as an axis, and may operate to roll the display 110 that is moved into the housing 10 based on the axis of the actuator 130. That is, the actuator 130 may protrude to the outside of the housing 10 through an opening 11 (FIG. 1) of the upper end of the housing 10 so that the display 110 is exposed, and cause the exposed display 110 to descend to be housed inside the housing 10 in a rolled state. When the display 110 is housed within the housing 10, the display 110 may be protected by the housing 10. According to an example, the actuator 130 may be implemented to move the display 110 by the rotation of a motor. For example, the number of rotations of the motor may be adjusted according to the height of the display 110 to be exposed to the outside of the housing 10. According to an example, a side on which a screen of the display 110 is provided can be rolled inwardly, but it is also possible that a side on which the screen is not provided can be rolled inwardly.

The processor 140 may control overall operations of the display apparatus 100. The processor 140 may be configured with one processor or a plurality of processors. For example, the processor 140 may perform the operation of the display apparatus 100 according to various embodiments of the disclosure by executing at least one instruction stored in a memory (not illustrated).

The processor 140 according to an embodiment may be implemented with, for example, and without limitation, a digital signal processor (DSP) for image-processing of a digital image signal, a microprocessor, a graphics processor (GPU), an AI (AI) processor, a neural processor (NPU), a time controller (TCON), or the like, but this is not limited thereto. The processor 140 may include, for example, and without limitation, one or more among a central processor (CPU), a micro controller unit (MCU), a micro-processor (MPU), a controller, an application processor (AP), a communication processor (CP), an advanced reduced instruction set computing (RISC) machine (ARM) processor, or may be defined as a corresponding term. The processor 140 may be implemented in a system on chip (SoC) type or a large scale integration (LSI) type which a processing algorithm is built therein, application specific integrated circuit (ASIC), or in a field programmable gate array (FPGA) type.

According to an embodiment, the processor 140 may obtain a viewing distance of the user based on a signal sensed by the sensor 120. Further, the processor 140 may identify the number of users based on a signal sensed by the sensor 120. The processor 140 may identify the user's viewing position based on a signal sensed by the sensor 120. The processor 140 may identify at least one of a ratio of image content, a resolution of the image content, a type (or genre) of the image content, or a viewing angle (field of view, FOV) of the image content. For example, the processor 140 may identify the ratio of the image content, the resolution of the image content, the type (or genre) of the image content, or the viewing angle of the image content based on the meta data received with the image content. Further, the processor 140 may identify at least one of a ratio or a viewing angle of the image content based on the type (or genre) of the image content.

According to an embodiment, the processor 140 may identify at least one of a size of a portion of the display 110 to be exposed to the outside of the housing 10 or a display size of image content to be displayed on the portion of the display 110 based on at least one of a viewing distance of the user, the number of users, a viewing position of the user, a ratio of image content, a resolution of image content, a type of image content, or a viewing angle of image content.

According to an embodiment, the processor 140 may identify at least one of a size of a portion of the display 110 to be exposed to the outside of the housing 10 or a display size of image content to be displayed on the portion of the display 110 based on a viewing distance of the user and a ratio of the image content to be displayed on the display 110. Here, the display size of the image content may refer to a size of a screen on which actual image content of at least a portion of the display 110 exposed to the outside of the housing 10 is displayed. For example, a black image may be displayed in a portion other than the portion of the display 110 where the actual image content is displayed.

According to an embodiment, the processor 140 may identify a size of a portion of the display 110 to be exposed to the outside of the housing 10 based on a viewing distance of the user and a ratio of image content to be displayed on the display 110. Here, the image content may be image content pre-stored in the display apparatus 100 or image content received from the outside. The ratio of the image content indicates an aspect ratio of the image content, and may be a variety of ratios such as 16:9, 21:9, or the like. For example, the processor 140 may identify a size of a portion of the display 110 that is to be exposed to the outside of the housing 10 to provide image content with a display size suitable for viewing at the viewing distance of the user based on a ratio of image content.

The processor 140 may identify a display size of the image content to be displayed on the portion of the display 110 exposed to the outside of the housing 10 based on the viewing distance of the user and the ratio of the image content. For example, the processor 140 may identify a display size suitable for viewing the image content at a viewing distance of the user based on a ratio of the image content.

If at least one of the size of the portion of the display 110 to be exposed to the outside of the housing 10 or the display size of the image content is identified, the processor 140 can control the actuator 130 to move or roll the display 110 based thereon.

According to an example, the processor 140 may identify a display size of the image content based on a viewing distance of the user and a ratio of image content, and then identify a size of a portion of the display 110 to be exposed to the outside of the housing 10 based on the identified display size. For example, if the display size of the image content is identified, the processor 140 may identify the size of the portion of the display 110 to be exposed to the outside of the housing 10 so that there is no empty portion at an upper side and a lower side of the portion of the display 10 where the image content is displayed. For example, the processor 140 may expose a portion of the display 110 to the outside of the housing 10 such that there is no remaining portion above and below the screen portion on which the image content is displayed, and when at least one of the right and the left of the screen portion in which the image content is displayed in one area of the display 110 remains, the processor 140 can display the black image on the corresponding portion.

Figure 3:
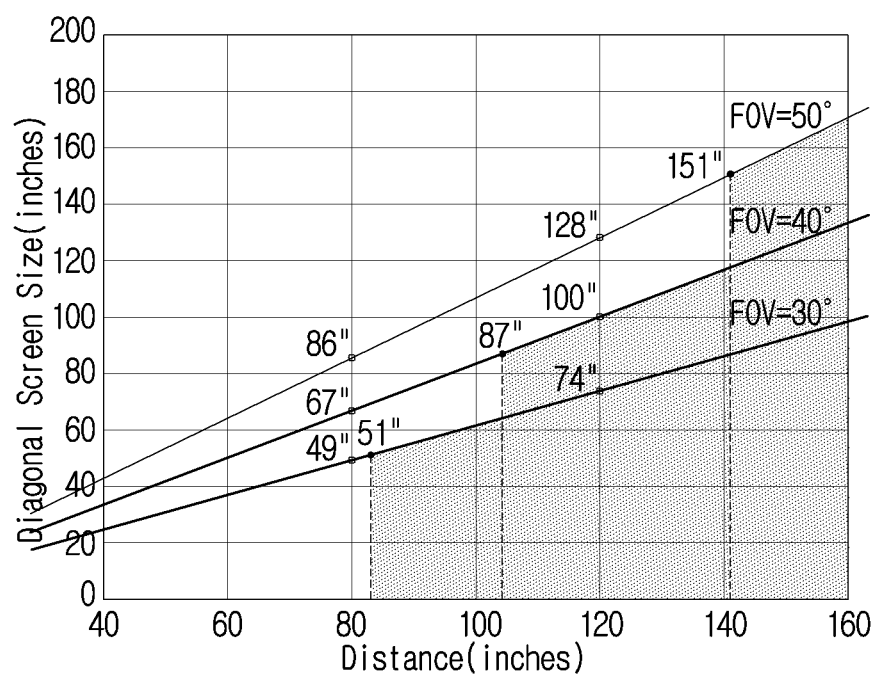
FIG. 3 is a diagram illustrating a viewing angle of image content according to an embodiment.

According to an embodiment, the processor 140 may identify a viewing angle of the image content based on the type of the image content and the viewing distance of the user. The processor 140 may identify at least one of a size of a portion of the display 110 to be exposed to the outside of the housing 10 or a display size of the image content based on a viewing angle of the image content and a ratio of the image content. Here, a field of view (FOV) or a viewing angle of the image content may refer to an angle at which a predetermined normal screen can be viewed for each image content type. According to an embodiment, an appropriate viewing angle for each viewing distance may be already identified for each type of image content. The corresponding viewing angle-related information may be stored in a memory (not illustrated), or may be received from the outside. For example, as illustrated in FIG. 3, the viewing angle according to the viewing distance may be identified according to types A, B, and C of each image content. For example, the processor 140 may calculate the display size on the basis of the FOV=50 degrees for sports, the FOV=30 degrees for news, the FOV=40 degrees for soap operas and movies. In this case, the processor 140 can adjust the screen size by fixing a diagonal screen size and calculating the display size of the X and Y axis according to the screen ratio. According to an example, if the user manually manipulates the screen size, the processor 140 may store the size in a memory (not illustrated) and may provide the image content using the stored screen size when providing the same type of image content.

According to an embodiment, when the viewing distance of the user is less than a threshold distance, the processor 140 may identify a size of a portion of the display 110 to be exposed to the outside of the housing 10 and a display size of the image content based on the viewing distance of the user and the ratio of the image content. For example, the processor 140 may display image content in the entire portion of the display 110 when the viewing distance of the user is greater than or equal to the threshold distance, and identify a size of a portion of the display 110 to be exposed to the outside of the housing 10 and a display size of the image content based on a ratio of the viewing distance and the image content of the user according to an embodiment only if the viewing distance of the user is less than the threshold distance.

According to an embodiment, when image content displayed on an external user terminal (not illustrated) is received while the display apparatus 100 operates in a mirroring mode, the processor 140 may identify a size of a portion of the display and a display size of the image content based on at least one of a viewing distance of the user, a viewing position of the user, a screen size (or resolution information) of a user terminal (not illustrated), resolution information of the image content, or ratio information of the image content. According to an example, the degree of exposure of the display 110 and the display size of the mirrored image content may vary according to the resolution of the user terminal (not illustrated).

The user terminal (not illustrated) may be, but is not limited to, a smart phone, a notebook, a tablet personal computer (PC), a cell phone, a personal digital assistant (PDA), a laptop, a media player, an e-book terminal, a digital broadcasting terminal, a navigation, an MP3 player, a digital camera, a home appliance, a wearable terminal such as a watch, glasses, a hair band and a ring, and other mobile or non-mobile computing devices. The user terminal (not illustrated) may embed a touch screen and may be implemented to execute a program using a finger or pen (e.g., a stylus pen). When the mirroring starts, other image content may be displayed on the screen of the external user terminal (not illustrated).

According to an embodiment, when information on a portion of the image content selected by the user is received from the image content displayed on the user terminal (not illustrated), the processor 140 may identify a size of a portion of the display 110 and a display size of the image content based on a viewing distance of the user and information on a portion of the image content. For example, a portion of the image content may be selected by a touch input through a user's finger or pen in a screen of a user terminal (not illustrated).

Here, the information on the portion of the image content may include ratio information for a portion of the image content selected by the user, but may be the image content itself selected by the user. In the latter case, the processor 140 may calculate ratio information of the image content based on the received image content, and identify a size of a portion of the display 110 and a display size of the image content based on the calculated ratio information and the viewing distance of the user. The processor 140 may identify a viewing angle of the image content based on the type information of the image content and the viewing distance of the user, and identify a size of a portion of the display 110 and a display size of the image content based on the viewing angle information and the ratio information of the image content.

According to an embodiment, the processor 140 may control the display 110 to display image content on a first portion of the display 110 while the first portion of the display 110 is disposed outside the housing 10 and a second portion of the display 110 is positioned within the housing 10. For example, as described above, the first portion of the display 110 may be disposed outside the housing 10 based on the viewing distance of the user and the ratio of image content. In this example, when an event for displaying a graphic user interface (GUI) occurs, the processor 140 may control the actuator 130 such that at least a portion of the second portion is disposed outside the housing 10 based on at least one of size information of the GUI, ratio information of the GUI, type information of the GUI, display location information of the GUI, or display direction information of the GUI. The processor 140 may release rolling of the portion of the display 110 rolled and housed in the housing 10 and control the actuator 130 so that the corresponding portion is disposed outside the housing 10. Here, the event for displaying the GUI may include an event in which a user command for displaying a GUI (e.g., an on-screen display (OSD) menu) is input through the display apparatus 100, an event in which a user command for displaying a GUI (e.g., an OSD menu) is input through an external device (e.g., a set-top box) in communication with the display apparatus 100, or the like. Here, the user command may be input through at least one of a remote control device, such as a remote controller, a user gesture, a voice command, or a button provided in the display apparatus 100.

In this example, the processor 140 may control the display 110 to display the GUI in at least a portion of the second portion that is additionally exposed out of the housing 10. That is, the processor 140 can control the display 110 to display the GUI on the exposed portion after exposing at least a portion of the display 110 housed in the housing 10, that is, at least a portion of the second portion, to the outside of the housing 10, rather than overlaying and displaying the GUI on the image content currently being displayed. For example, the processor 140 may write image content to a portion of a memory in which an image frame is written, write a GUI to another portion of the memory to generate one frame, and control the display 110 to display the generated frame.

In some cases, the image content received from the outside may include the GUI. In this case, if there is image content that does not include a GUI that is received separately from the image content including the GUI, the processor 140 may display an entire image content based on the corresponding image content, identify the GUI portion in the image content including the GUI, and control the display 110 to display the GUI in a portion separate from the portion where the image content is displayed based on the portion. For example, if the display apparatus 100 includes a plurality of input interfaces associated with corresponding image content, or a plurality of tuners, it may be possible to receive image content including a GUI and image content not including a GUI. In this example, the processor 140 may identify whether the GUI is included in the image content based on flag information received with the image content. As another example, if the input interface associated with the corresponding image content is one, or one tuner is provided, when the image content including the GUI and the image content not including the GUI are alternately received in at least one frame unit, the GUI can be provided in a portion separate from the image content according to the above-described embodiment.

Alternatively, the processor 140 may identify at least one of type information of the GUI, display location information of the GUI, or display direction information of the GUI based on the size of the portion of the display 110 exposed to the outside of the housing 10, and provide the GUI based on the identified information.

Although the above-described embodiment is limited to the GUI, various UI screens can be applied to the corresponding embodiment. Here, the UI screen may include not only the GUI but also screens producing various contents such as images, moving images, text, music, or the like, an application execution screen including various contents, a web browser screen, or the like.

According to an embodiment, the processor 140 may control the display 110 to display image content on a first portion of the display 110 while the first portion of the display 110 is disposed outside the housing 10 and a second portion of the display 120 is disposed within the housing 10. For example, as described above, the first portion of the display 110 may be disposed outside the housing 10 based on the viewing distance of the user and the ratio of image content. In this example, the processor 140 may control the actuator 130 so that at least a portion of the second portion is disposed outside the housing 10 based on the size of a subtitle content when the subtitle content is included in the image content. Here, the size of the subtitle content may include the number of letters of the subtitle content, the font size of the subtitle content, or the like.

The processor 140 may control the display 110 to display the subtitle content in at least a portion of the second portion that is additionally exposed out of the housing 10. That is, the processor 140 can control the display 110 to display the subtitle content on the exposed portion after exposing at least a portion of the display 110 housed in the housing 10, that is, at least a portion of the second portion, to the outside of the housing 10, rather than overlaying and displaying the subtitle content on the image content currently being displayed.

However, in the above-described embodiment, after exposing the first portion of the display 110 and additionally exposing the second portion for convenience of description, the processor 140 may control the actuator 130 so that at least a portion of the display 110 is exposed to the outside of the housing 10 by the combined size of the size of the portion in which the video content is displayed and the size of the portion in which the subtitle content is displayed.

According to an embodiment, the processor 140 may control the actuator 130 to adjust a size of a portion of the display 110 exposed to the outside of the housing 10 according to a user command. In this example, the processor 140 may change at least one of the size of the image content, the resolution of the image content, the type of image content or the external source (user terminal, external source device (e.g., set-top box, DVD player), external server, or the like) based on the size of the portion of the display 110 exposed to the outside of the housing 10. Here, the user command may be received from a remote control device (not illustrated) or input by a button provided in the display apparatus 100. According to an example, when the size of the portion of the display 110 exposed to the outside is reduced, the processor 140 can control the display 110 to display the image content by reducing the image content according to the reduced size and enlarge the image content according to the enlarged size when the size of one area of the display 110 exposed to the outside is enlarged. In this case, the processor 140 can reduce or enlarge the display size of the image content while maintaining the ratio of the image content. The processor 140 can control the display 110 to display various GUIs or additional information in a corresponding portion when a margin is generated in a portion of the display 110 as the size of the portion of the display 110 is reduced while the ratio of the image content is maintained.

According to another example, if the size of the portion of the display 110 exposed to the outside is reduced, at least one of the resolution of the image content or the type of image content may be changed. For example, if the size of the portion of the display 110 exposed to the outside of the housing 10 is reduced, the processor 140 can control the display 110 to display the image content by reducing the resolution of the image content. If the size of the exposed portion is reduced while the UI is being displayed in the portion of the display 110 exposed to the outside of the housing 10, the processor 140 can control the display 110 to change a format of the displayed UI.

According to an embodiment, a front surface of the housing 10 may be implemented with a transparent material. For example, the front surface of the housing 10 may be implemented with glass or a transparent display in some cases. Any transparent material is applicable without limitation.

In a state where the entire portion of the display 110 is housed in the housing 10 in a rolled state, when a user is sensed through the sensor 120, the processor 140 may provide a welcome feedback. Here, the welcome feedback may be provided to a portion of the display 110 in a rolled state, or may be provided in the form of sound through a speaker. For example, the sensing of the user may be the case in which the user is sensed in the viewing area of the display apparatus 100. When the processor 140 senses that the user has entered home through another Internet of things (IoT) device, the processor 140 may receive the corresponding information through the IoT network and provide welcome feedback.

According to an example, when the user is sensed through the sensor 120 while the entire portion of the display 110 is housed in the housing 10 and the display 110 is turned off, the processor 140 can control the display 110 to display background content in a portion of the display disposed toward the front surface of the housing 10 inside the housing 10. That is, the processor 140 may control the display 110 to display background content of the display 110 housed within the housing 10 in a rolled state.

Here, the background content may include at least one of time content, weather content, lighting content, or photographic content. The type of content provided according to an example may be preset based on a user setting, or a plurality of content types may be alternately provided. The content provided according to an example may be pre-stored in the display apparatus 100, or may be streaming content from an external server or an external device. For example, when the user is sensed by the processor 140, the processor 140 may automatically communicate with a user terminal (not illustrated) and control the display 110 to display the photo content received from the user terminal (not illustrated).

In the above embodiment, the display 110 may provide a welcome feedback in a state of being housed in the housing 10, but according to another example, a welcome feedback may be provided by exposing a portion of the display 110 to the outside of the housing 10.

According to an embodiment, when the user is sensed more than a threshold time through the sensor 120 while the entire portion of the display 110 is housed in the housing 10 and turned off, the display 110 can be controlled to display the content displayed before the display 110 was turned off or recommendation content in a portion of the display 110 positioned toward the front surface of the housing 10 inside the housing 10. However, the processor 140 may control the display 110 to expose a portion of the display 110 to the outside of the housing 10 and to display the content displayed before the display 110 was turned off in the exposed portion. For example, the processor 140 may control the display 110 to display the previous viewing content if the user is sensed in a radial portion of a predetermined angle (e.g., 120 degrees) with respect to the display apparatus 100 and is maintained within the corresponding portion for more than five seconds. Here, a channel through which the previous viewing content is viewed, a previously viewed video on demand (VOD) content, or the like, may be included and the recommended content may be selected based on a viewing history of the user.

For example, the processor 140 may control the display 110 to display background content within a threshold time from immediately after the user has been sensed and if the user is sensed for a threshold time or more, and may control the display 110 to display the content displayed before the display 110 was turned off. As another example, the processor 140 may control the display 110 to display background content within a threshold time from immediately after the user has been sensed, and if the user is sensed for a threshold time or more, may expose a portion of the display 110 to the outside of the housing 10, and display the content displayed before the display 110 was turned off in the exposed portion.

According to an embodiment, the processor 140 may control the actuator 130 so that the exposed portion of the display 110 is housed into the housing 10 when the display 110 is turned on, for example, while the display 110 is displaying content while the display 110 is disposed outside the housing 10. In this example, the processor 140 may maintain a turn-on state of the display 110 or change the display 110 to a turn-off state. For example, the processor 140 may maintain the turn-on state in a state where the display 110 is fully housed, and may change the display 110 to the turn-off state if the user is not continuously detected for a pre-identified time or more. However, in some cases, the processor 140 may change the display 110 to the turn-off state immediately after all the display 110 has been housed.

According to an embodiment, when the display 110 is turned on while the display 110 is turned off, the processor 140 may control the display 110 to operate in one of a plurality of display modes based on a viewing history of the user. Here, the plurality of display modes may include a mode in which an exposed height is different according to an example. According to another example, the plurality of display modes may include a mode in which different contents (according to an example, time content, weather content, lighting content or picture content, according to another example, background content or previous viewing content, and according to still another example, image content or audio content) are displayed.

According to an embodiment, the processor 140 may sense a user's gaze height and identify a size of a portion of the display 110 exposed to the outside of the housing 10 and a display size of the image content based on the user's gaze height. For example, the processor 140 may adjust the size of a portion of the display 110 exposed to the outside of the housing 10 and the display size of the image content differently when the user views the image content while sitting or standing.

According to an embodiment, when a plurality of users are sensed, the processor 140 may identify a size of a portion of the display 110 exposed to the outside of the housing 10 and a display size of the image content based on the viewing positions of the plurality of users. In one example, the processor 140 may adjust the size of a portion of the display 110 exposed to the outside of the housing 10 and the display size of the image content differently when the plurality of users are viewing content together in a particular viewing area (e.g., a sofa) or are viewing content in a scattered manner from separate viewing areas (e.g., a sofa, floor, exercise device, etc.). As another example, the processor 140 may identify a size of a portion of the display 110 exposed to the outside of the housing 10 and a display size of the image content based on a viewing distance which is the closest, among the plurality of users (e.g., 120 inches (about 3M viewing distance)) when the plurality of users are sensed.

According to an example, the processor 140 can differently control the input method according to the height of the display 110. For example, in a mode in which the display 110 is housed in the housing 10, a touch is possible through the transparent front surface of the housing 10, and in a mode where at least a portion of the display 110 is exposed to the outside of the housing 10, a bezel portion touch is possible. However, this is merely an example, and the processor 140 can control so that various input methods such as touch recognition, motion recognition, voice recognition, control by a remote control device, button control, or the like, are possible in various combinations according to each mode. The mode may include a case in which the exposure height of the display 110 is different, but it is also possible to define a specific exposure height as a separate mode. For example, a state in which the entire display 110 is housed may be defined as a first mode, a state in which a portion of the display 110 is exposed may be defined as a second mode, and a state in which the entire display 110 is exposed may be defined as a third mode. In this example, the display apparatus 100 in each of the first mode, the second mode, and the third mode may operate differently. For example, in each of the first mode, the second mode, and the third mode, a type of content provided through the display 110 may be different, the resolution of the content may be different, the external source connected to the display 110 may be different, or the output state of the speaker may be different.

However, if the image content is provided according to the identified size of the portion of the display 110 and the display size of the image content, when it is identified that a quality of an image falls short of a standard quality, the processor 140 may enlarge the display size of the image content to the maximum based on the size of the exposed portion of the display 110. In this example, if a subtitle is provided, the processor 140 can separately enlarge the subtitle size and provide the same.

Figure 4A:
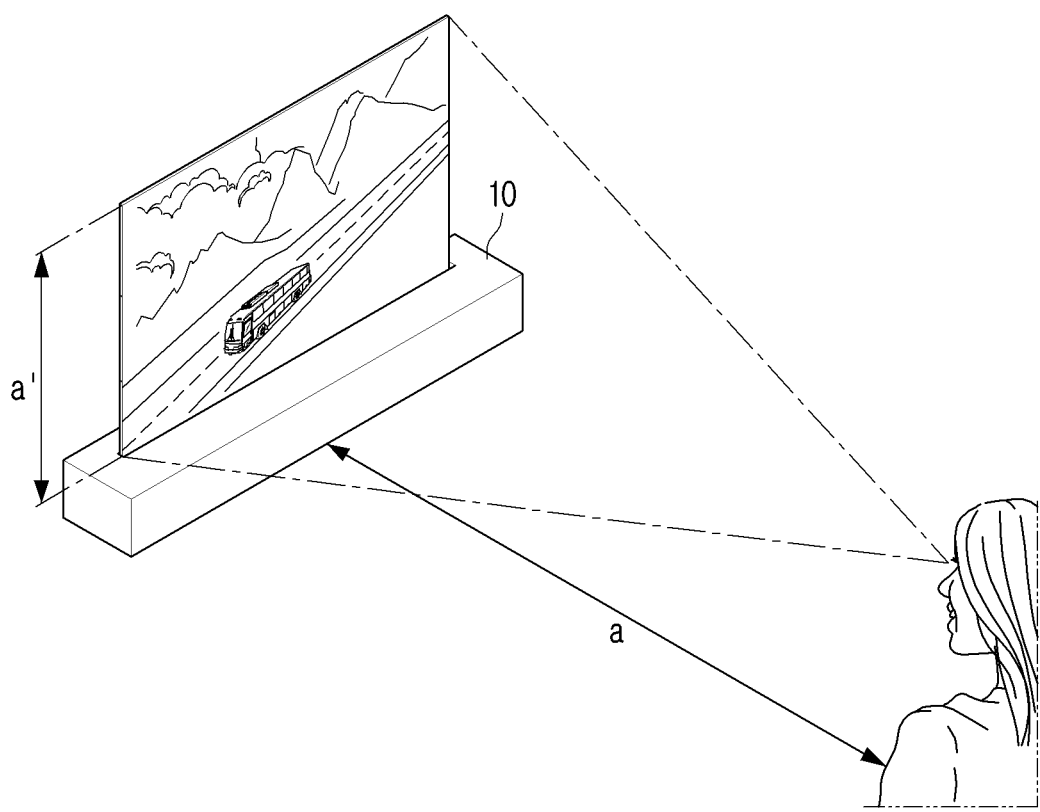
FIG. 4A is a diagram illustrating a controlling method of a display apparatus according to an embodiment.
Figure 4B:
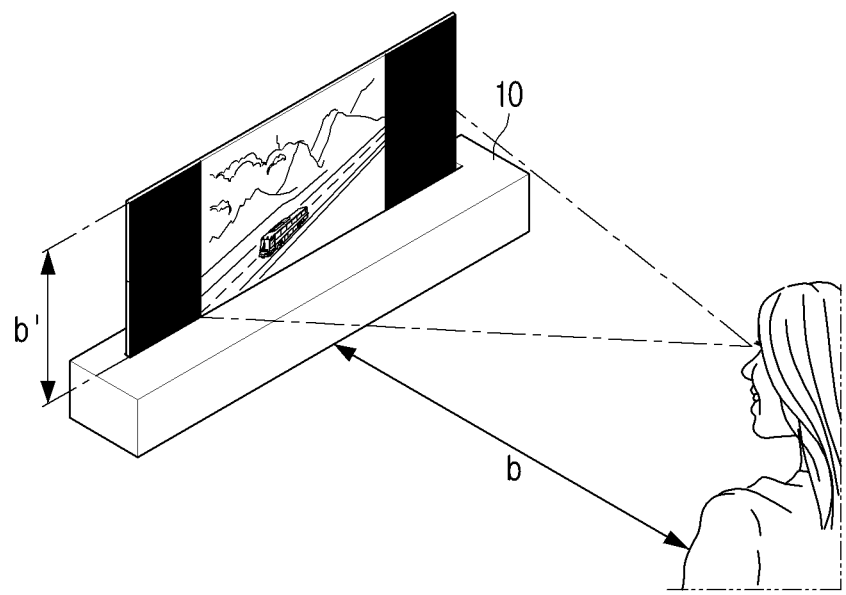
FIG. 4B is a diagram illustrating a controlling method of a display apparatus according to an embodiment.

FIGS. 4A and 4B are diagrams illustrating a controlling method of a display apparatus according to an embodiment.

According to an embodiment, the processor 140 may adjust the exposure height of the display 110 based on the viewing position of the user. For example, as shown in FIGS. 4A and 4B, it is assumed that the user moves the viewing position from distance a to distance b.

As illustrated in FIG. 4A, when the viewing distance of the user is sensed as the distance a, the processor 140 can control the actuator 130 to expose the display 110 to the outside of the housing 10 by a height a'. In this example, the processor 140 may expose the display 110 to the outside of the housing 10 by height a' in consideration of at least one of the ratio of the image content or the viewing angle of the image content as well as the viewing distance of the user.

When the viewing distance of the user is sensed as distance b as illustrated in FIG. 4B, the processor 140 may control the actuator 130 to expose the display 110 to the outside of the housing 10 by height b'.

As illustrated in FIGS. 4A and 4B, even when the same image content is displayed, the height of the display 110 exposed to the outside of the housing 10 can be adjusted differently based on the viewing distance of the user.

Figure 5A:
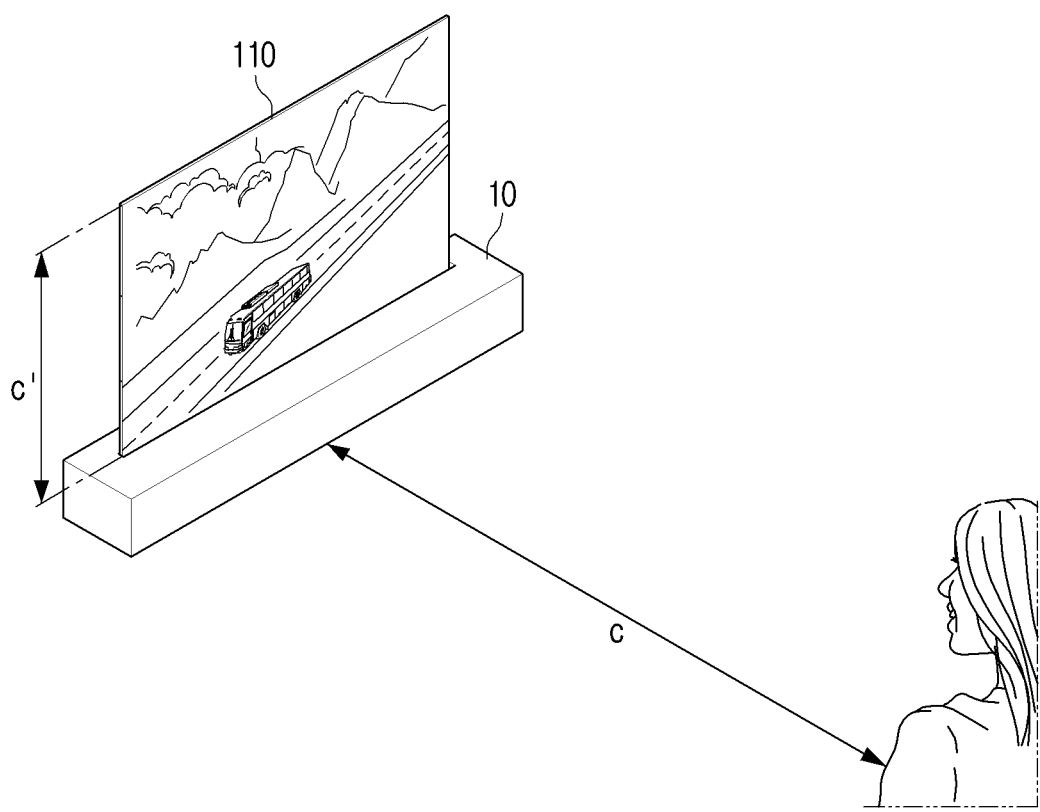
FIG. 5A is a diagram illustrating a controlling method of a display apparatus according to an embodiment.
Figure 5B:
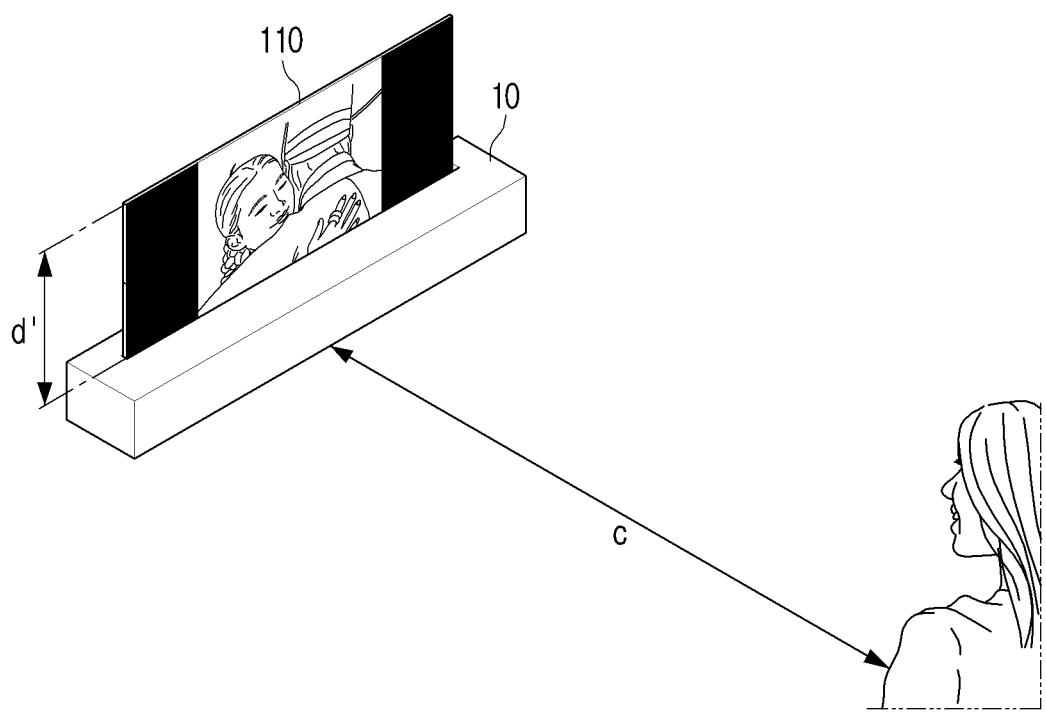
FIG. 5B is a diagram illustrating a controlling method of a display apparatus according to an embodiment.

FIGS. 5A and 5B are diagrams illustrating a controlling method of a display apparatus according to an embodiment.

According to an embodiment, the processor 140 may adjust the exposure height of the display 110 based on a ratio of the image content. For example, as shown in FIGS. 5A and 5B, while the user is viewing the first image content at the same viewing position, the viewing content may change to the second image content. Here, the ratio of the first image content may be 16:9 and the ratio of the second image content may be 21:9.

As illustrated in FIG. 5A, since the ratio of the first image content is 16:9, the processor 140 can control the actuator 130 such that the exposure height of the display 110 is c' so that the ratio of the first image content is satisfied based on the viewing distance c of the user. That is, the processor 140 may adjust the exposure height of the display 110 such that there is no margin in the upper and lower portions of the display 110.

As illustrated in FIG. 5B, if the viewing content is changed from the first image content to the second image content, the processor 140 may control the actuator 130 so that the exposure height of the display 110 becomes d' so as to satisfy the ratio of the second image content in the viewing distance c of the user.

Referring to FIGS. 5A and 5B, if the viewing distance of the user is the same, when the ratio of the image content is different, the exposure height of the display 110 is changed.

Figure 6A:
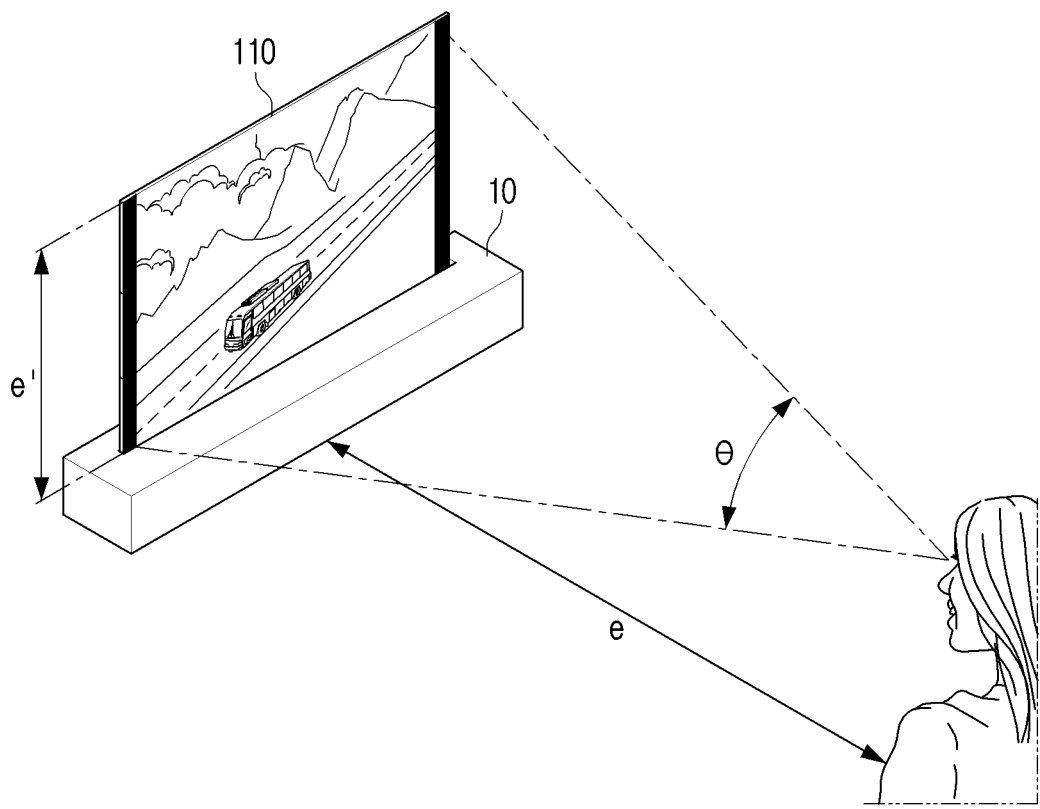
FIG. 6A is a diagram illustrating a controlling method of a display apparatus according to an embodiment.
Figure 6B:
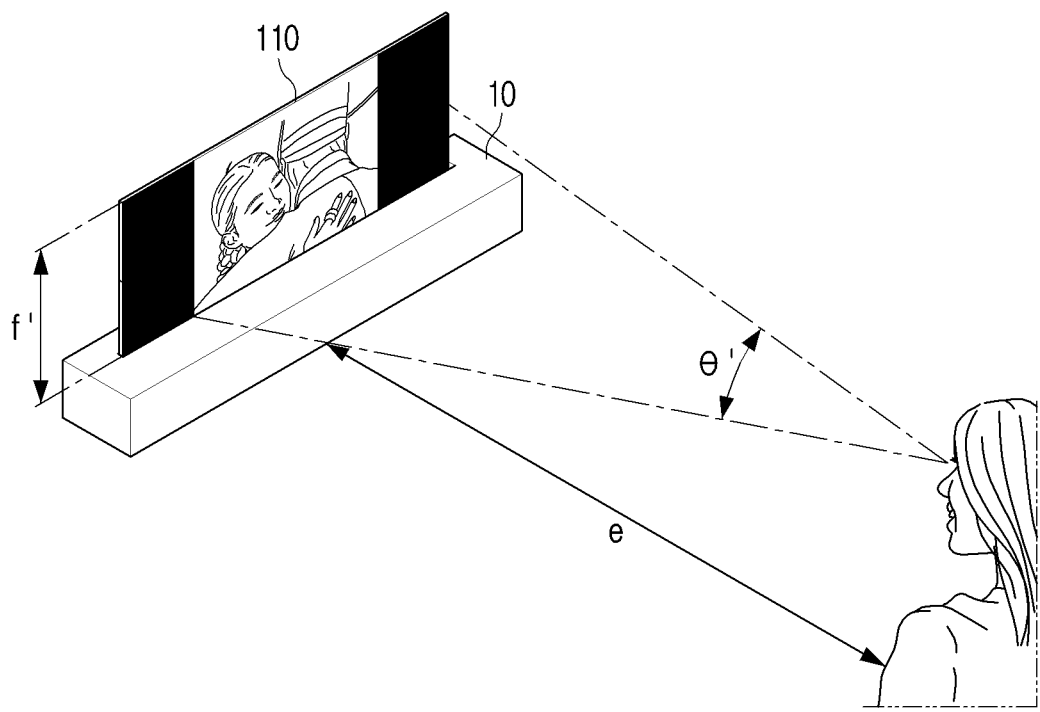
FIG. 6B is a diagram illustrating a controlling method of a display apparatus according to an embodiment.

FIGS. 6A and 6B are diagrams illustrating a controlling method of a display apparatus according to an embodiment.

According to an embodiment, the processor 140 may adjust the exposure height of the display 110 based on the viewing distance of the user and the viewing angle of the image content. For example, as shown in FIGS. 6A and 6B, while the user views the first image content at the same viewing position, the user may change the viewing content to the second image content. Here, the ratio of the first image content and the ratio of the second image content are the same (e.g., 16:9), the viewing angle of the first image content is theta ($\theta$), and the viewing angle of the second image content is $\theta'$ ($<\theta$).

As illustrated in FIG. 6A, since the viewing angle of the first image content is $\theta$, the processor 140 can control the actuator 130 such that the exposure height of the display 110 becomes e' so that the viewing angle of the first image content is satisfied based on the viewing distance e of the user.

As illustrated in FIG. 6B, if the viewing content is changed from the first image content to the second image content, the processor 140 may control the actuator 130 so that the exposure height of the display 110 becomes f' in order to satisfy the viewing angle $\theta'$ of the second image content at the viewing distance e of the user.

According to FIGS. 6A and 6B, even if the viewing distance of the user and the image content ratio are the same, when the viewing angle of the image content is different, the exposure height of the display 110 is changed.

The viewing angle of the image content is shown as being an angle corresponding to the diagonal direction length of the image content, that is, the display portion, but the embodiment is not limited thereto and it is also possible to set the viewing angle to an angle corresponding to a horizontal length or a vertical direction length of the image content.

Figure 7A:
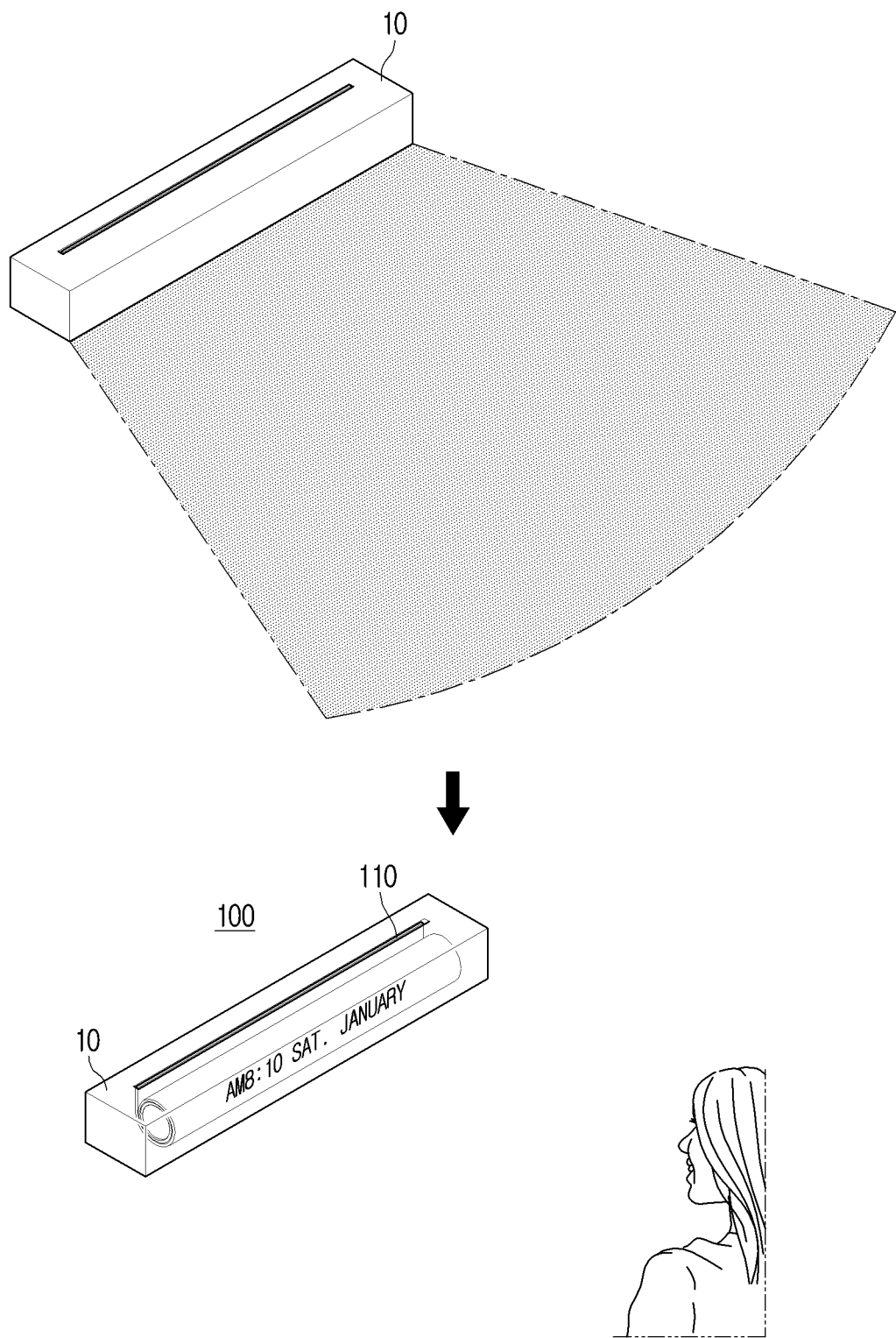
FIG. 7A is a diagram illustrating a controlling method of a display apparatus according to another embodiment.
Figure 7B:
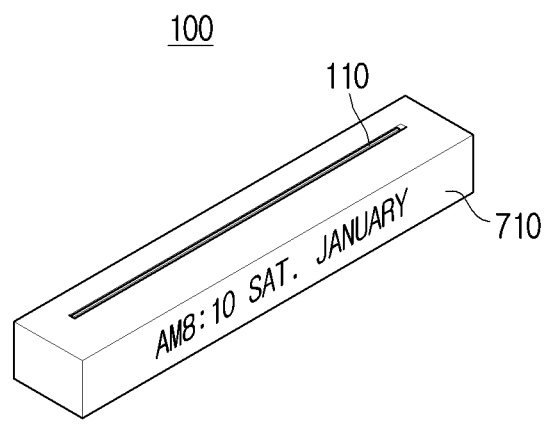
FIG. 7B is a diagram illustrating a controlling method of a display apparatus according to another embodiment.

FIGS. 7A and 7B are diagrams illustrating a controlling method of a display apparatus according to another embodiment.

According to an embodiment, the front surface of the housing 10 may be made of a transparent material so that a portion of the housed display can be seen.

As illustrated in the upper side of FIG. 7A, it is assumed that the entire portion of the display 110 is housed in the housing 10 in a rolled state and turned off In this example, if the user is detected, the processor 140 can display background content in a portion of the display 110 positioned toward the front surface of the housing 10 inside the housing 10, as illustrated on the lower side of FIG. 7A. Here, the background content may include at least one of time content, weather content, lighting content, or photo content.

According to another embodiment, a separate display 710 may be provided on the front surface of the housing 110 as illustrated in FIG. 7B. In this example, if the user is detected, the processor 140 may display the background content on a corresponding display 710.

Figure 8:
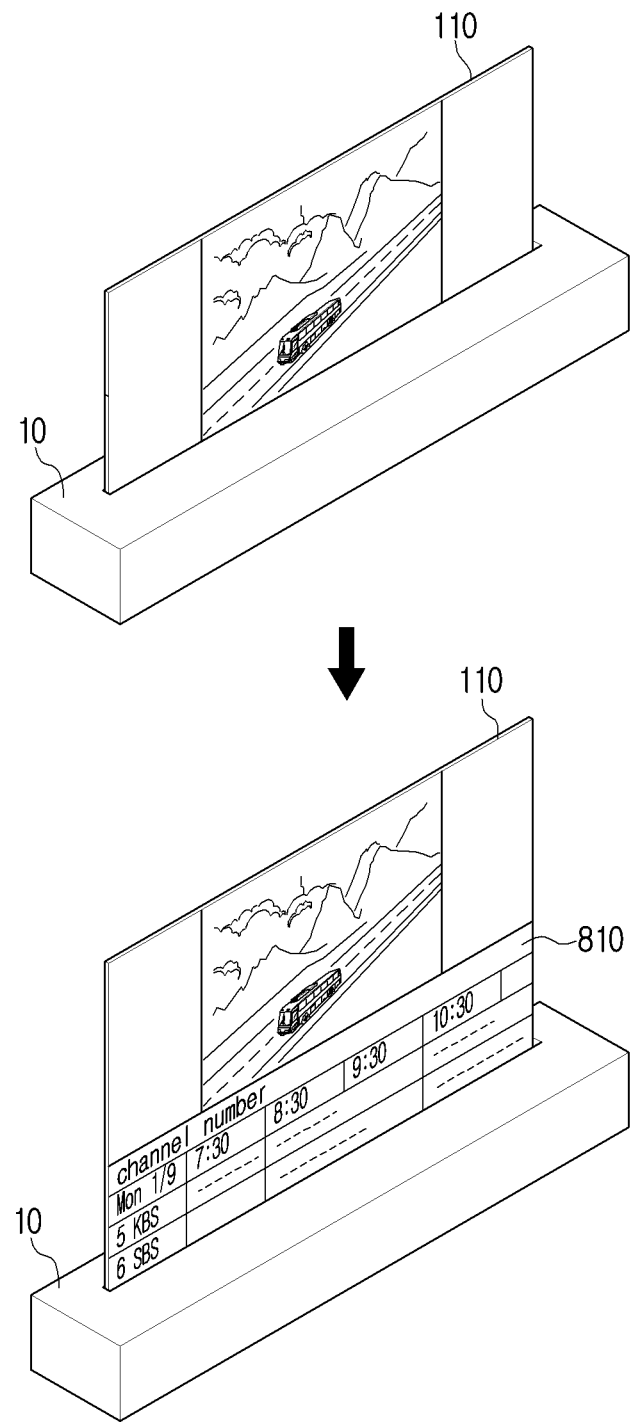
FIG. 8 is a diagram illustrating a controlling method of a display apparatus according to another embodiment.

FIG. 8 is a diagram illustrating a controlling method of a display apparatus according to another embodiment.

According to an embodiment, as shown in the upper side of FIG. 8, a first portion of the display 110 may be disposed outside the housing 10, a second portion of the display 110 may be disposed inside the housing 10, and the image content may be displayed through the exposed first portion.

In this example, when an event for displaying a graphic user interface (GUI) occurs, the processor 140, as shown in the lower side of FIG. 8, based on at least one of size information or ratio information of the GUI, may release rolling of at least a portion of the second portion of the display 110 that is rolled and housed in the housing so that the portion of the second portion is disposed outside the housing. The processor 140 may control the display 110 to display a GUI 810 in at least a portion of the second portion exposed outside the housing 10. The processor 140 can control the display 110 to display the GUI on the exposed portion after exposing at least a portion of the display 110 housed in the housing 10, that is, at least a portion of the second portion, to the outside of the housing 10, rather than overlaying and displaying the GUI on the image content currently being displayed.

Figure 9:
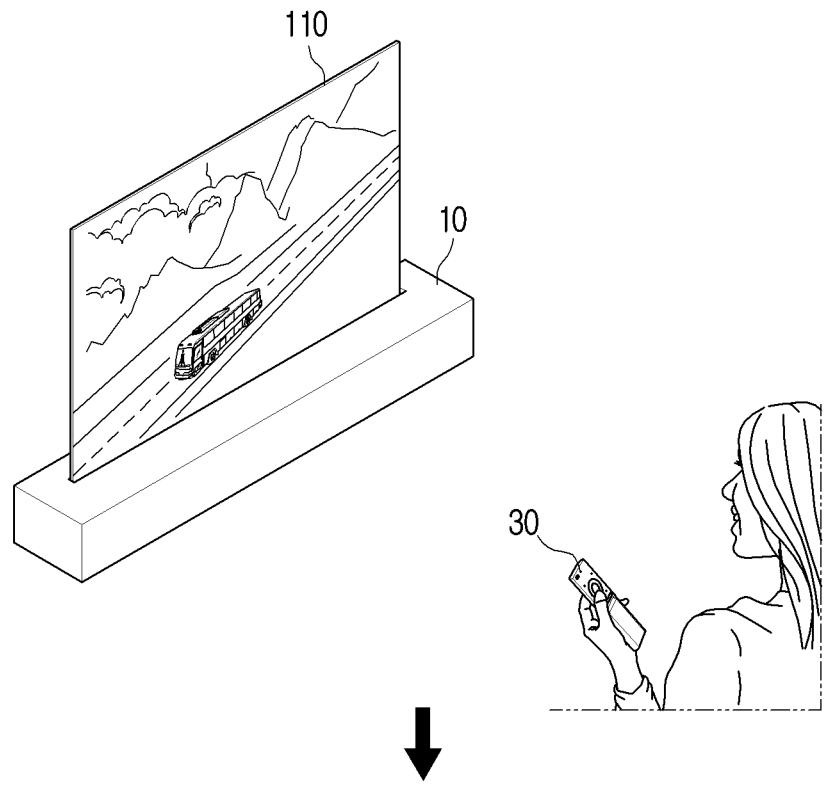
FIG. 9 is a diagram illustrating a controlling method of a display apparatus according to another embodiment.
Figure 9:
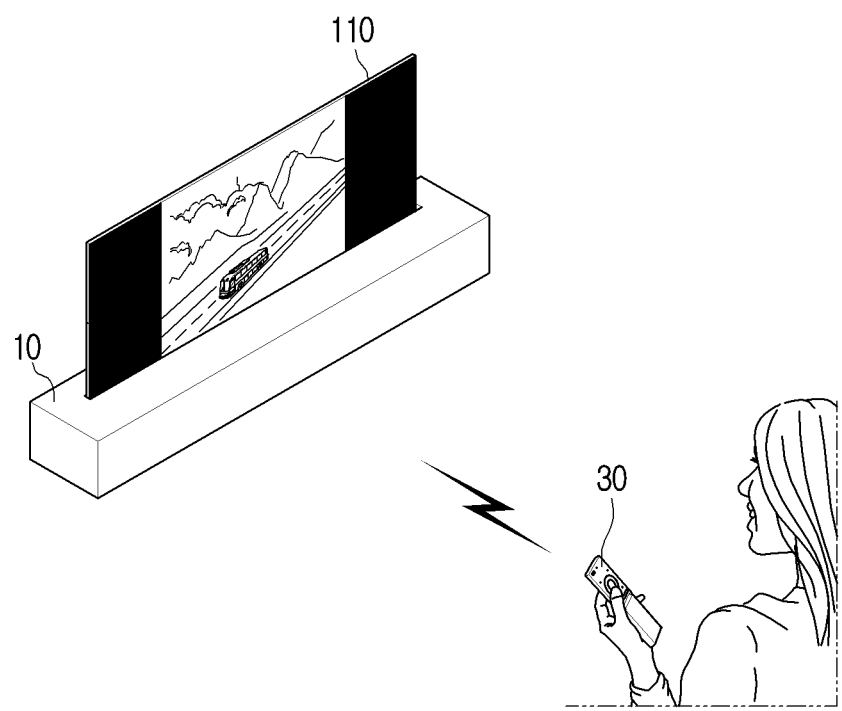

FIG. 9 is a diagram illustrating a controlling method of a display apparatus according to another embodiment.

According to an embodiment, as shown in the upper side of FIG. 9, when all of the exposable portions of the display 110 are exposed to the outside of the housing 10, the image content is displayed on the exposed entire portion.

In this example, if a user command to adjust the exposure height of the display 110 is received from an external device, for example, a remote control device 30, the processor 140 can adjust the exposure height of the display 110 in accordance with the user command, as illustrated in the lower side of FIG. 9. The processor 140 may change the display size of the image content based on the exposure height of portion of the display 110. For example, as illustrated in the lower side of FIG. 9, the processor 140 may reduce the display size of the image content so as to maintain the ratio of the image content.

In this example, although not shown in the drawings, the processor 140 may display a menu screen (e.g., electronic program guide (EPG) information) or additional information related to the displayed image content (e.g., detailed information, associated content information, etc.) without displaying a black screen on the margin portion generated as the size of the image content is reduced.

Figure 10A:
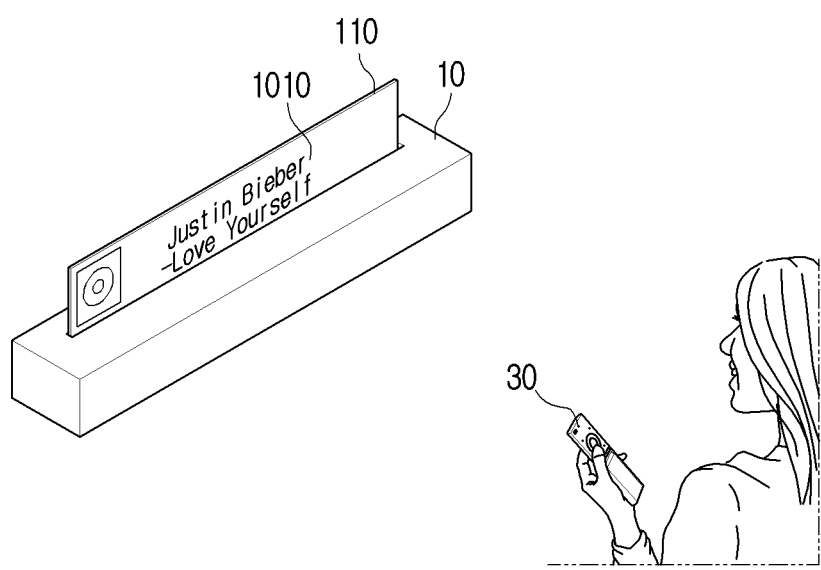
FIG. 10A is a diagram illustrating a controlling method of a display apparatus according to another embodiment.
Figure 10B:
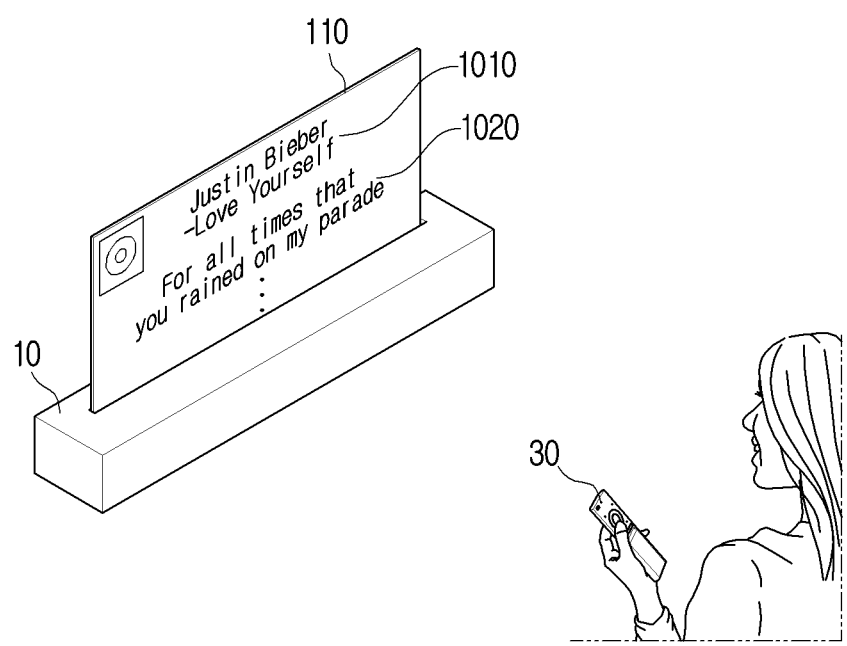
FIG. 10B is a diagram illustrating a controlling method of a display apparatus according to another embodiment.

FIGS. 10A and 10B are diagrams illustrating a controlling method of a display apparatus according to another embodiment.

According to an embodiment, the processor 140 may change the depth of information provided according to the exposure height of the display 110 differently.

For example, as illustrated in FIG. 10A, when a portion of the portion of the display 110 is exposed to the outside of the housing 10, the sound content (e.g., an audio file of which file extension includes MP3, WMA, OGG, WAV, etc.) is reproduced, and brief information 1010 related to the sound content that is being reproduced (e.g., a progress bar, title, singer, genre, track information, album jacket, etc.) is provided in the exposed portion. Here, reproducing the sound content from an external source may include reproducing prestored sound content, and receiving and reproducing the sound content reproduced from an external source (e.g., a mobile phone) in a streaming form.

In this example, if a portion of the display 110 is additionally exposed according to a user command (e.g., a user command using the remote control device 30) as shown in FIG. 10B, the processor 140 can provide additional information (e.g., lyrics) 1020 related to the reproduced sound content to the additionally exposed portion. For example, the processor 140 may convert the corresponding information into a UI of a specific ratio corresponding to the additionally exposed display portion and provide the same. However, in some cases, the processor 140 may additionally expose a portion of the display 110 according to another user command (e.g., an additional information view) to provide additional information (e.g., lyrics) 1020 related to the sound content to the additionally exposed portion.

According to an example, the operations described in FIGS. 10A and 10B may be made in a user log-in state in an external source (e.g., a cell phone).

Figure 11:
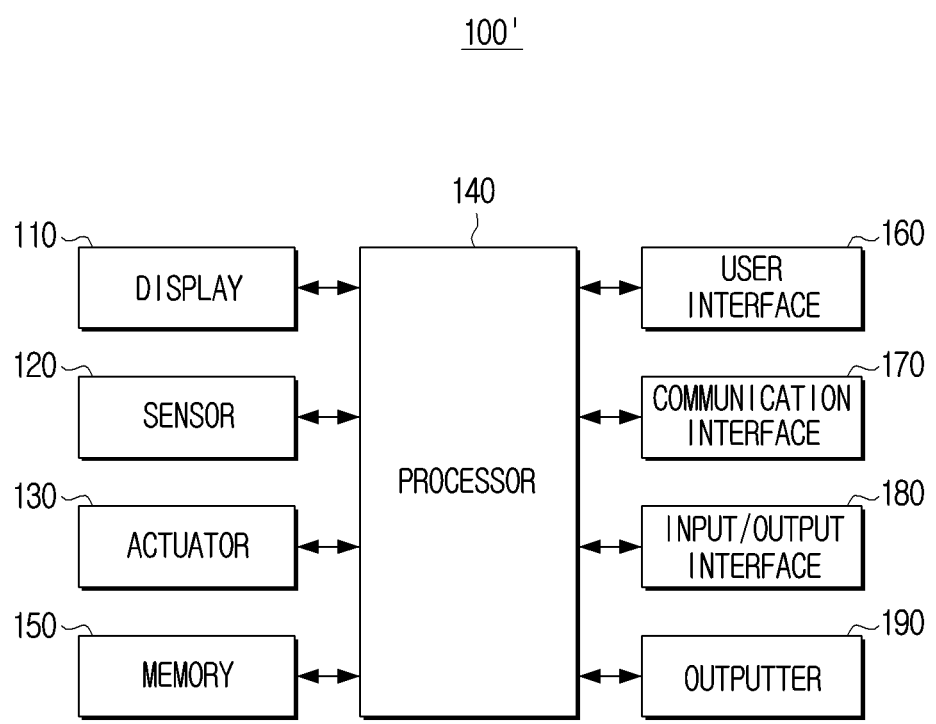
FIG. 11 is a diagram illustrating an embodiment of a display apparatus according to an embodiment.

FIG. 11 is a diagram illustrating an embodiment of a display apparatus according to an embodiment.

Referring to FIG. 11, the display apparatus 100' includes the display 110, the sensor 120, the actuator 130, the processor 140, the memory 150, a user interface 160, a communication interface 170, and an input/output interface 180. Among the configurations of FIG. 11, a configuration overlapping with FIG. 2 will not be described.

The processor 140 may perform processing on the audio data. Specifically, the processor 140 may perform various processes such as decoding, amplification, noise filtering, or the like, for the audio data.

The memory 150 may store data necessary for various embodiments of the disclosure. The memory 150 may be implemented as a memory embedded in a display apparatus 100' or may be implemented as a detachable memory in the display apparatus 100' according to the data usage purpose. For example, data for driving the display apparatus 100' may be stored in a memory embedded in the display apparatus 100', and data for an additional function of the display apparatus 100' may be stored in the memory detachable to the display apparatus 100'. A memory embedded in the display apparatus 100' may be a volatile memory such as a dynamic random access memory (DRAM), a static random access memory (SRAM), a synchronous dynamic random access memory (SDRAM) or a nonvolatile memory. (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive or a solid state drive (SSD), or the like, and in the case of a memory detachably mounted to the display apparatus 100', the memory may be implemented as a memory card (for example, a compact flash (CF), secure digital (SD), micro secure digital (micro-SD), mini secure digital (mini-SD), extreme digital (xD), multi-media card (MMC), etc.), an external memory (for example, a USB memory) connectable to the USB port, or the like, but the disclosure is not limited thereto.

According to an embodiment, the memory 150 may store various data, programs, or applications for driving/controlling the display apparatus 100'. The memory 150 may store a control program for controlling the display apparatus 100' and the processor 140, an application initially provided by a manufacturer or downloaded from the outside, databases, or related data.

The user interface 160 may be implemented with a device such as a button, a touch pad, a mouse, and a keyboard, or may be implemented as a touch screen, a remote control transceiver, or the like, which can perform a display function and an operation input function. The remote control transceiver may receive a remote control signal from an external remote control device or transmit a remote control signal through at least one communication method among infrared communication, Bluetooth communication, or Wi-Fi communication.

The communication interface 170 may perform communication with various external devices.

According to an embodiment, the communication interface 170 may receive various types of content. For example, the communication interface 170 may receive an image signal by streaming or downloading from an external device (for example, a source device), an external storage medium (for example, a universal serial bus (USB) device), an external server (for example, a web server, etc.) through communication methods such as an access point (AP)-based Wi-Fi (wireless LAN network), Bluetooth, Zigbee, wired/wireless local area network (LAN), wide area network (WAN), Ethernet, IEEE 1394, high definition multimedia interface (HDMI), universal serial bus (USB), mobile high-definition link (MHL), advanced encryption standard (AES)/European broadcasting union (EBU), optical, coaxial, or the like. Here, the image signal may be a digital image signal of at least one of a standard definition (SD), high definition (HD), full HD, or ultra HD, but is not limited thereto.

The input/output (I/O) interface 180 may be any one of a High Definition Digital Multimedia Experience Interface (HDMI), a Mobile Digital High-Definition Link (MHL), a Universal Serial Bus (USB), a Display Port (DP), a Thunderbolt, a Video Graphics Array (VGA) port, an RGB port, a D-subminiature (D-SUB), or a Digital Visual Interface (DVI). The I/O interface 180 may input and output at least one of audio and video signals.

The outputter 190 outputs an acoustic signal. For example, the outputter 190 may convert the digital sound signal processed by the processor 140 into an analog sound signal, amplify and output the analog sound signal. For example, the outputter 190 may include various output circuitry, such as, for example, and without limitation, at least one speaker unit, a D/A converter, an audio amplifier, or the like, capable of outputting at least one channel. According to an example, the outputter 190 may be implemented to output various multi-channel sound signals. The processor 140 may control the outputter 190 to process the input sound signal in accordance with the enhanced processing of the input image. For example, the processor 140 may convert an input two-channel sound signal into a virtual multi-channel (for example, 5.1 channel) sound signal, recognize a position where the display apparatus 100' is disposed to process the signal as a cubic sound signal optimized to a space, or provide an optimized sound signal according to the type of input image (for example, a content genre).

The display apparatus 100' may further include a microphone (not illustrated). The microphone is configured to receive user voice or other sound and convert the same into audio data. For example, a user command input on a UI screen according to various embodiments of the disclosure may be input in the form of a voice command.

The display apparatus 100' may further include a tuner and a demodulator according to an embodiment. A tuner (not illustrated) may receive a radio frequency (RF) broadcast signal by tuning a channel selected by a user or all pre-stored channels among RF broadcast signals received through an antenna. The demodulator may receive and demodulate the digital intermediate frequency (IF) signal and digital IF (DIF) signal converted by the tuner, and perform channel decoding, or the like. The input image received via the tuner according to an example embodiment may be processed via the demodulator (not illustrated) and then provided to the processor 140 for image processing according to an example embodiment.

Figure 12A:
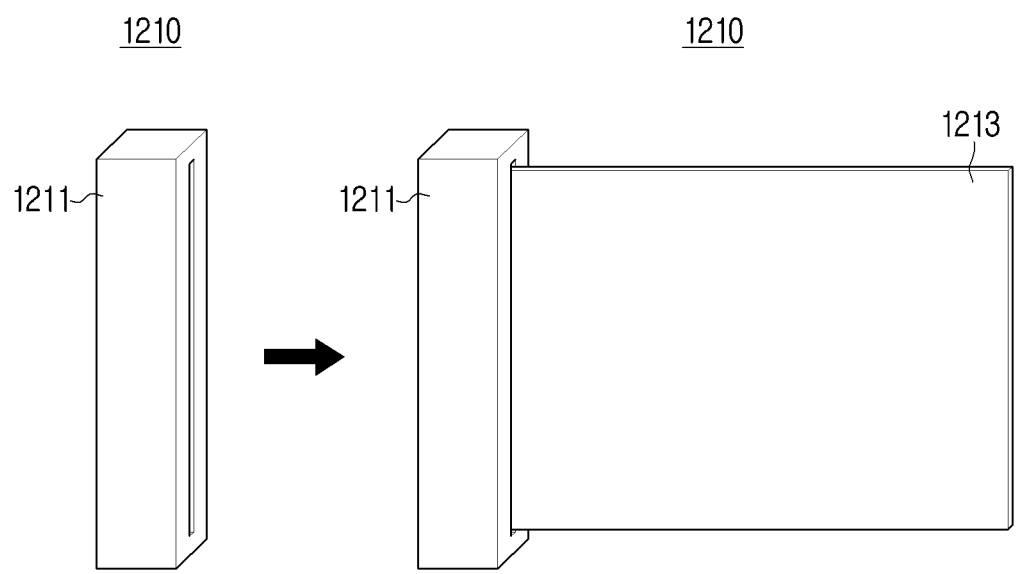
FIG. 12A is a diagram illustrating an embodiment of a display apparatus according to various embodiments.
Figure 12B:
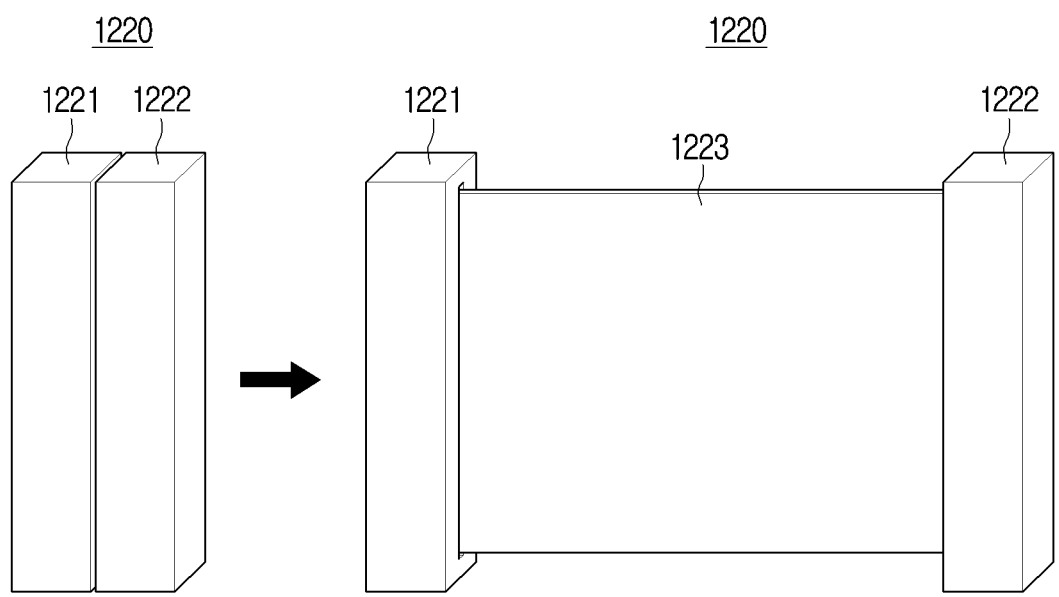
FIG. 12B is a diagram illustrating an embodiment of a display apparatus according to various embodiments.
Figure 12C:
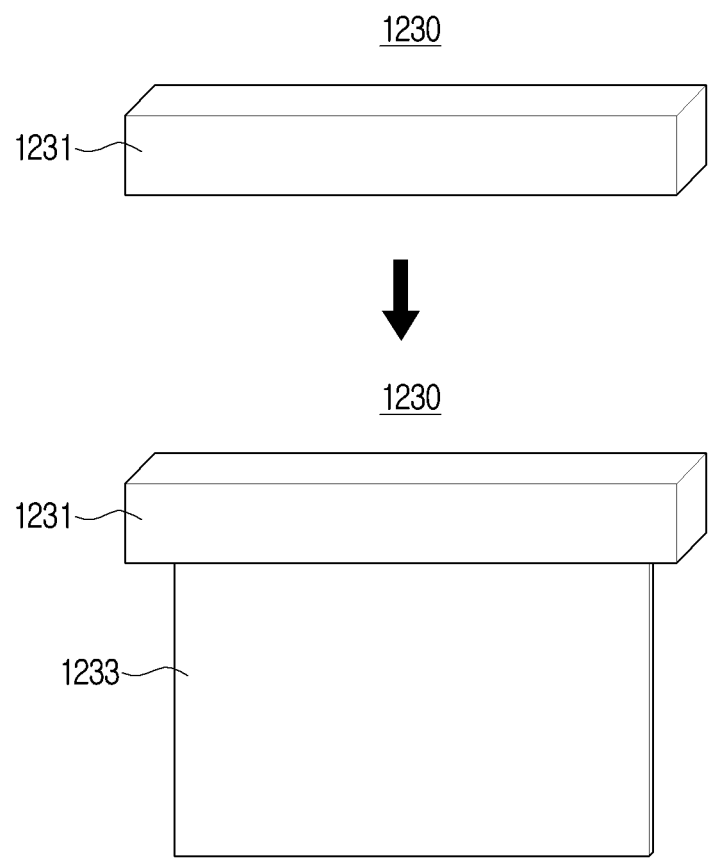
FIG. 12C is a diagram illustrating an embodiment of a display apparatus according to various embodiments.

FIGS. 12A to 12C are diagrams illustrating an embodiment of a display apparatus according to various embodiments.

As shown in FIG. 12A, a display apparatus 1210 may be configured in a form that a display 1213 is rolled in the longitudinal direction to be housed in a housing 1211, and in the form of being released from rolling in the horizontal direction.

As shown in FIG. 12B, a display apparatus 1220 may be embodied in a form in which the display 1223 is rolled to both sides in the longitudinal direction to be housed in the plurality of housings 1221 and 1222, and in the form of being released from rolling in the horizontal direction from the plurality of housings 1221 and 1222, respectively.

As shown in FIG. 12C, the display apparatus 1230 may be implemented in such a manner that the display 1233 is released from rolling from the housing 1231 from an upper side in a downward direction. For example, the housing 1231 may be formed in the form of a wall hanging on a wall.

Figure 13:
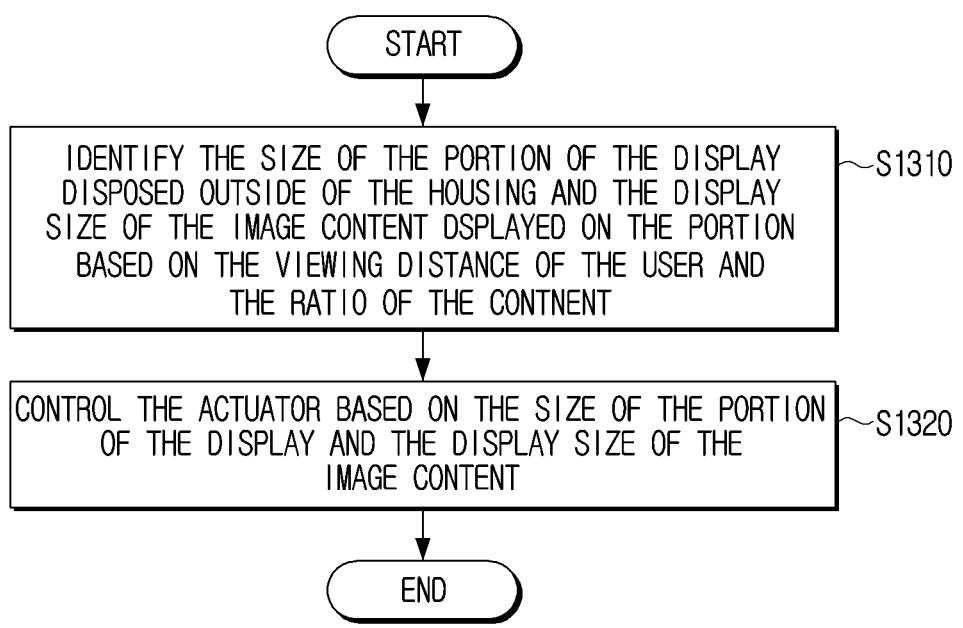
FIG. 13 is a flowchart illustrating a controlling method of a display apparatus according to an embodiment.

FIG. 13 is a flowchart illustrating a controlling method of a display apparatus according to an embodiment.

In a method of controlling the display apparatus shown in FIG. 13, the display apparatus 100 may include a housing including an upper opening and an inner housing space, and a display housed in the housing space in a rolled state and configured to be moved in and out of the housing through the opening.

According to FIG. 13, the display apparatus 100 may identify a size of a portion of the display to be disposed the outside of the housing and the display size of the image content to be displayed on the portion of the display based on the viewing distance of the user and the ratio of the image content in operation S1310.

The display may be moved based on the size of the portion of the display and the display size of the image content, and the image content may be displayed in operation S1320.

In operation S1310, the viewing angle of the image content may be identified based on the type of the image content and the viewing distance of the user, and the size of the portion of the display and the display size of the image content may be identified based on the viewing angle of the image content and the ratio of the image content.

In operation S1310, if the viewing distance of the user is less than the threshold distance, the size of the portion of the display and the display size of the image content can be identified based on the viewing distance of the user and the ratio of the image content.

In operation S1310, when the image content displayed on the external user terminal is received in the mirroring mode, the size of the portion of the display and the display size of the image content may be identified based on the viewing distance of the user, the screen size of the user terminal, and the ratio information of the image content.

In operation S1310, when information on a portion of the image content selected by the user is received from the image content displayed on the external user terminal, the size of the portion of the display and the display size of the image content can be identified based on the viewing distance of the user and the information on the portion of the image content. Here, the information on the portion of the image content may include ratio information relative to the portion of the image content.

The control method of the display apparatus 100 may further include displaying the image content on the first portion of the display while the first portion of the display is disposed outside the housing and the second portion of the display is disposed within the housing, and based on an event to display a graphic user interface (GUI) occurring, moving the display so that at least a portion of the second portion is disposed outside the housing based on at least one of size information or rate information of the GUI.

The control method of the display apparatus 100 may further include displaying image content on the first portion of the display while the first portion of the display is disposed outside the housing and the second portion of the display is disposed within the housing, and based on the subtitle content being included in the image content, moving the display so that at least a portion of the second portion is disposed outside the housing based on the size of the subtitle content.

The control method of the display apparatus 100 may further include adjusting a size of a portion of the display exposed to the outside of the housing according to a user command, and changing at least one of a size of the image content, a resolution of the image content, or a type of image content based on the size of the portion of the display exposed to the outside of the housing.

The front surface of the housing may be made of a transparent material, and the control method of the display apparatus 100 may further include displaying background content in the portion of the display disposed toward the front surface of the housing inside the housing based on the user being sensed while the display is housed in the housing and turned off.

According to the various embodiments described above, an optimal viewing content may be provided by sensing a user, and the convenience of a user may be improved.

At least some of the various embodiments of the disclosure may be performed through an image receiving device, such as a set-top box, or an external server, as well as a display apparatus.

The methods according to various embodiments may be implemented as a format of software or application installable to a related art electronic apparatus.

The methods according to various embodiments may be implemented by software upgrade of a related art electronic apparatus, or hardware upgrade only.

Meanwhile, various embodiments of the disclosure may be implemented in software, including instructions stored on machine-readable storage media readable by a machine (e.g., a computer). An apparatus may call instructions from the storage medium, and execute the called instruction, including an image processing apparatus (for example, image processing apparatus A) according to the disclosed embodiments. When the instructions are executed by a processor, the processor may perform a function corresponding to the instructions directly or using other components under the control of the processor. The instructions may include a code generated by a compiler or a code executable by an interpreter. A machine-readable storage medium may be provided in the form of a non-transitory storage medium. Herein, the "non-transitory" storage medium may not include a signal but is tangible, and does not distinguish the case in which a data is semi-permanently stored in a storage medium from the case in which a data is temporarily stored in a storage medium.

According to an embodiment, the method according to the above-described embodiments may be included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™) or distributed online directly. In the case of online distribution, at least a portion of the computer program product may be at least temporarily stored or temporarily generated in a server of the manufacturer, a server of the application store, or a machine-readable storage medium such as memory of a relay server.

According to various embodiments, the respective elements (e.g., module or program) of the elements mentioned above may include a single entity or a plurality of entities. According to the embodiments, at least one element or operation from among the corresponding elements mentioned above may be omitted, or at least one other element or operation may be added. Alternatively or additionally, a plurality of components (e.g., module or program) may be combined to form a single entity. In this case, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

While various embodiments have been illustrated and described with reference to various embodiments, the disclosure is not limited to specific embodiments or the drawings, and it will be understood by those of ordinary skill in the art that various changes in form and details may be made therein without departing from the spirit and scope of the disclosure, including the appended claims and their equivalents.

What is claimed is:

1. A display apparatus comprising:
a sensor;
a housing comprising a storage space inside the housing;
a display configured to be stored in the storage space inside the housing and to be moved into and out of the housing through an opening of the housing, the display having a display area for displaying contents;
an actuator configured to move the display into and out of the housing through the opening; and
a processor configured to:
identify a size of a portion of the display area to be disposed outside the housing and a display size of a first image content to be displayed on the portion of the display, based on a viewing distance of a user sensed through the sensor and an aspect ratio of the first image content, control the actuator to move the display into or out of the housing through the opening based on the size of the portion of the display area and the display size of the first image content, control the display to display the first image content on the portion of the display area, and based on an image content to be displayed on the portion of the display being changed from the first image content to a second image content, adjust the size of the portion of the display area based on an aspect ratio of the second image content and the viewing distance of the user sensed through the sensor, wherein the aspect ratio of the second image content being different from the aspect ratio of the first image content, wherein the processor is further configured to:

identify a field of view (FOV) of the first image content based on a type of the first image content and the viewing distance of the user, and identify the size of the portion of the display area and the display size of the first image content based on the FOV of the first image content and the aspect ratio of the first image content.

2. The display apparatus of claim 1, wherein the processor is further configured to, based on the viewing distance of the user being less than a threshold distance, identify the size of the portion of the display area and the display size of the first image content based on the viewing distance of the user and the aspect ratio of the first image content.

3. The display apparatus of claim 1, further comprising: a communication interface, wherein the processor is further configured to, based on receiving, through the communication interface, content displayed on an external user terminal in a mirroring mode, identify the size of the portion of the display area and the display size of the first image content based on the viewing distance of the user, a screen size of the external user terminal, and ratio information of the content displayed on the external user terminal.

4. The display apparatus of claim 3, wherein the processor is further configured to:

based on receiving information on a portion of the content displayed on the external user terminal selected by a user, identify the size of the portion of the display area and a display size of the content based on the viewing distance of the user and the information on the portion of the content displayed on the external user terminal, wherein the information on the portion of the content displayed on the external user terminal comprises ratio information on the portion of the content displayed on the external user terminal.

5. The display apparatus of claim 1, wherein the processor is further configured to:

while a first portion of the display area is being disposed outside the housing and a second portion of the display area is being disposed inside the housing, control the display to display the first image content on the first portion of the display, and based on an event to display a graphic user interface (GUI) occurring, control the actuator to move at least a portion of the second portion to be disposed outside the housing based on at least one of size information or ratio information of the GUI while the first image content is displayed on the first portion, and control the display to display the first image content on the first portion and to display the GUI on at least the portion of the second portion disposed outside the housing.

6. The display apparatus of claim 1, wherein the processor is further configured to:

while a first portion of the display area is being disposed outside the housing and a second portion of the display area is being disposed inside the housing, control the display to display the first image content on the first portion of the display, and based on subtitle content being included in the first image content, control the actuator so that at least a portion of the second portion is disposed outside the housing based on a size of the subtitle content.

7. The display apparatus of claim 1, wherein the processor is further configured to:

control the actuator to adjust the size of the portion disposed outside the housing in accordance with a user command, and change at least one of a size of the first image content, a resolution of the first image content or a type of the first image content based on the size of the portion of the display area disposed outside the housing.

8. The display apparatus of claim 1, wherein a front surface of the housing is implemented with a transparent material, and wherein the processor is further configured to:

based on the user being sensed through the sensor in a state of the display area being housed in the housing and turned off, control the display to display a background content on a portion of the display area disposed toward a front surface of the housing inside the housing.

9. The display apparatus of claim 1, further comprising: a memory configured to store a viewing history of a user, wherein the processor is further configured to, based on the display being turned on from a state of being turned off, control the display so that the display operates in one of a plurality of display modes based on the viewing history of the user.

10. A display apparatus comprising:

a sensor;

a housing comprising a storage space inside the housing;

a display configured to be stored in the storage space inside the housing and to be moved into and out of the housing through an opening of the housing, the display having a display area for displaying contents;

an actuator configured to move the display into and out of the housing through the opening; and a processor configured to:

identify a size of a portion of the display area to be disposed outside the housing and a display size of a first image content to be displayed on the portion of the display, based on a viewing distance of a user sensed through the sensor and an aspect ratio of the first image content, control the actuator to move the display into or out of the housing through the opening based on the size of the portion of the display area and the display size of the first image content, control the display to display the first image content on the portion of the display area, and based on an image content to be displayed on the portion of the display being changed from the first image content to a second image content, adjust the size of the portion of the display area based on an aspect ratio of the second image content and the viewing distance of the user sensed through the sensor, wherein the aspect ratio of the second image content being different from the aspect ratio of the first image content, wherein a front surface of the housing is implemented with a transparent material, and wherein the processor is further configured to:

based on the user being sensed for a threshold time or more through the sensor in a state of the display area being housed in the housing and turned off, control the display to display a content displayed before the display was turned off on a portion of the display area disposed toward a front surface of the housing inside the housing.

11. A controlling method of a display apparatus comprising a housing comprising a storage space inside the housing, a display configured to be stored in the storage space inside the housing and to be moved into and out of the housing through an opening of the housing, the display having a display area for displaying contents and, an actuator configured to move the display into and out of the housing through the opening, the method comprising:

identifying a size of a portion of the display area to be disposed outside the housing and a display size of a first image content to be displayed on the portion of the display, based on a viewing distance of a user and an aspect ratio of the first image content;

controlling the actuator to move the display into or out of the housing through the opening based on the size of the portion of the display area and the display size of the first image content;

controlling the display to display the first image content on the portion of the display area; and based on an image content to be displayed on the portion of the display being changed from the first image content to a second image content, adjusting the size of the portion of the display area based on an aspect ratio of the second image content and the viewing distance of the user sensed through a sensor, wherein the aspect ratio of the second image content being different from the aspect ratio of the first image content, wherein the identifying of the display size of the first image content comprises:

identifying a field of view (FOV) of the first image content based on a type of the first image content and the viewing distance of the user, and identifying the size of the portion of the display area and the display size of the first image content based on the FOV of the first image content and the aspect ratio of the first image content.

12. The method of claim 11, wherein the identifying of the display size of the first image content comprises, based on the viewing distance of the user being less than a threshold distance, identifying the size of the portion of the display area and the display size of the first image content based on the viewing distance of the user and the aspect ratio of the first image content.

13. The method of claim 11, wherein the identifying of the display size of the first image content comprises, based on receiving, through a communication interface, content displayed on an external user terminal in a mirroring mode, identifying the size of the portion of the display area and the display size of the first image content based on the viewing distance of the user, a screen size of the external user terminal, and ratio information of the content displayed on the external user terminal.

14. The method of claim 13, wherein the identifying of the display size of the first image content comprises, based on receiving information on a portion of the content displayed on the external user terminal selected by a user, identifying the size of the portion of the display area and the display size of the first image content based on the viewing distance of the user and the information on the portion of the content displayed on the external user terminal, wherein the information on the portion of the content displayed on the external user terminal comprises ratio information on the portion of the content displayed on the external user terminal.

15. The method of claim 11, further comprising:

while a first portion of the display area is being disposed outside the housing and a second portion of the display area is being disposed inside the housing, displaying the first image content on the first portion of the display; and based on an event to display a graphic user interface (GUI) occurring, controlling the actuator to move at least a portion of the second portion to be disposed outside the housing based on at least one of size information or ratio information of the GUI while the first image content is displayed on the first portion, and displaying the first image content on the first portion and displaying the GUI on at least the portion of the second portion disposed outside the housing.

16. The method of claim 11, further comprising:

while a first portion of the display area is being disposed outside the housing and a second portion of the display area is being disposed inside the housing, displaying the first image content on the first portion of the display; and based on subtitle content being included in the first image content, moving the display so that at least a portion of the second portion is disposed outside the housing based on a size of the subtitle content.

17. The method of claim 11, further comprising:

adjusting the size of the portion disposed outside the housing in accordance with a user command; and changing at least one of a size of the first image content, a resolution of the first image content or a type of the first image content based on the size of the portion of the display area disposed outside the housing.

18. The method of claim 11, wherein a front surface of the housing is implemented with a transparent material, and the method further comprises:

based on the user being sensed in a state of the display area being housed in the housing and turned off, displaying a background content on a portion of the display area disposed toward a front surface of the housing inside the housing.

19. A controlling method of a display apparatus comprising a housing comprising a storage space inside the housing, a display configured to be stored in the storage space inside the housing and to be moved into and out of the housing through an opening of the housing, the display having a display area for displaying contents and, an actuator configured to move the display into and out of the housing through the opening, the method comprising:

identifying a size of a portion of the display area to be disposed outside the housing and a display size of a first image content to be displayed on the portion of the display, based on a viewing distance of a user and an aspect ratio of the first image content;

controlling the actuator to move the display into or out of the housing through the opening based on the size of the portion of the display area and the display size of the first image content;

controlling the display to display the first image content on the portion of the display area; and based on an image content to be displayed on the portion of the display being changed from the first image content to a second image content, adjusting the size of the portion of the display area based on an aspect ratio of the second image content and the viewing distance of the user sensed through a sensor, wherein the aspect ratio of the second image content being different from the aspect ratio of the first image content, wherein a front surface of the housing is implemented with a transparent material, and wherein the method further comprises, based on the user being sensed for a threshold time or more through a sensor in a state of the display area being housed in the housing and turned off, displaying a content displayed before the display was turned off on a portion of the display area disposed toward a front surface of the housing inside the housing.

* * * * *